United States Patent
Jain et al.

(10) Patent No.: US 11,869,002 B2
(45) Date of Patent: Jan. 9, 2024

(54) CARD AUTHENTICATION TECHNIQUE SELECTION VIA MACHINE LEARNING

(71) Applicant: PayPal, Inc., San Jose, CA (US)

(72) Inventors: Aditya Jain, Morgan Hill, CA (US); Piyush Neupane, Hayward, CA (US); Yogesh Krishna Kandlur, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 44 days.

(21) Appl. No.: 17/513,144

(22) Filed: Oct. 28, 2021

(65) Prior Publication Data

US 2023/0140792 A1 May 4, 2023

(51) Int. Cl.
*G06Q 20/40* (2012.01)
*G06Q 20/34* (2012.01)

(52) U.S. Cl.
CPC .......... *G06Q 20/401* (2013.01); *G06Q 20/34* (2013.01)

(58) Field of Classification Search
None
See application file for complete search history.

(56) References Cited

U.S. PATENT DOCUMENTS

| | | | | |
|---|---|---|---|---|
| 10,853,385 | B1* | 12/2020 | Truong | G06N 3/0472 |
| 11,106,994 | B1* | 8/2021 | Batalov | G06N 5/04 |
| 2015/0066768 | A1* | 3/2015 | Williamson | G06Q 20/405 |
| | | | | 705/44 |
| 2017/0093920 | A1* | 3/2017 | Ducatel | G06F 21/316 |
| 2020/0042155 | A1* | 2/2020 | Mehedy | G06F 3/04817 |
| 2020/0134628 | A1* | 4/2020 | Jia | G06N 20/00 |
| 2021/0042736 | A1* | 2/2021 | Kursun | G06Q 20/405 |
| 2021/0125179 | A1* | 4/2021 | Mach | G06N 7/005 |
| 2021/0158036 | A1* | 5/2021 | Huber, Jr. | G06V 30/413 |
| 2022/0122061 | A1* | 4/2022 | Musil | G06Q 20/4016 |

OTHER PUBLICATIONS

"PCI Data security Standard, Information Supplement: PCI DSS Tokenization Guidelines, Aug. 2011" (Year: 2011).*
"Rod Garratt, Token-or Account Based? A digital Currency can be both, Federal Reserve Bank of New York, Aug. 12, 2020" (Year: 2020).*

* cited by examiner

*Primary Examiner* — Kito R Robinson
*Assistant Examiner* — Toan Duc Bui
(74) *Attorney, Agent, or Firm* — Greenberg Traurig, LLP

(57) ABSTRACT

Systems and techniques for facilitating card authentication technique selection via machine learning are provided. In various embodiments, a processor can access an attribute vector associated with a financial payment card. In various instances, the processor can determine, via execution of a machine learning model, whether to authenticate the financial payment card with a zero-dollar authentication technique or instead with a tokenization authentication technique, based on the attribute vector. In various cases, the processor can execute the zero-dollar authentication technique with respect to the financial payment card, when the processor determines that the financial payment card should be authenticated with the zero-dollar authentication technique. In various aspects, the processor can execute the tokenization authentication technique with respect to the financial payment card, when the processor determines that the financial payment card should be authenticated with the tokenization authentication technique.

20 Claims, 15 Drawing Sheets

CARD AUTHENTICATION TECHNIQUE SELECTION VIA MACHINE LEARNING

TECHNICAL FIELD

The subject disclosure relates generally to card authentication, and more specifically to systems and/or techniques that can facilitate card authentication technique selection via machine learning.

BACKGROUND

Before a financial payment card is accepted by an online financial transaction platform or added to an online financial transaction wallet, the financial payment card must first be authenticated. In current practice, there exist two different techniques for authenticating financial payment cards, each having its own advantages and disadvantages: zero-dollar authentication and tokenization authentication. Zero-dollar authentication is considered the gold standard authentication technique, but it incurs a fixed cost for every financial payment card that is attempted to be authenticated. In contrast, tokenization authentication has no cost per financial payment card that is successfully authenticated, but not every financial payment card can be successfully authenticated via tokenization, and time/resources are wasted by attempting to perform tokenization authentication on such financial payment cards. Furthermore, for many financial payment cards, both zero-dollar authentication and tokenization authentication achieve the same authentication result. That is, for such cards, both authentication techniques yield successful authentications, or both authentication techniques yield unsuccessful authentications. However, for many other financial payment cards, zero-dollar authentication and tokenization authentication achieve different authentication results. That is, for such cards, one authentication technique yields a successful authentication while the other authentication technique yields an unsuccessful authentication. Unfortunately, there exist no systems that determine, for an online financial transaction platform or an online financial transaction wallet, which authentication technique to use for a given financial payment card to maximize the likelihood of successful authentication and/or to otherwise minimize the cost associated with authentication.

Accordingly, systems and/or techniques that can address one or more of these problems can be desirable.

DETAILED DESCRIPTION

Figure 1:
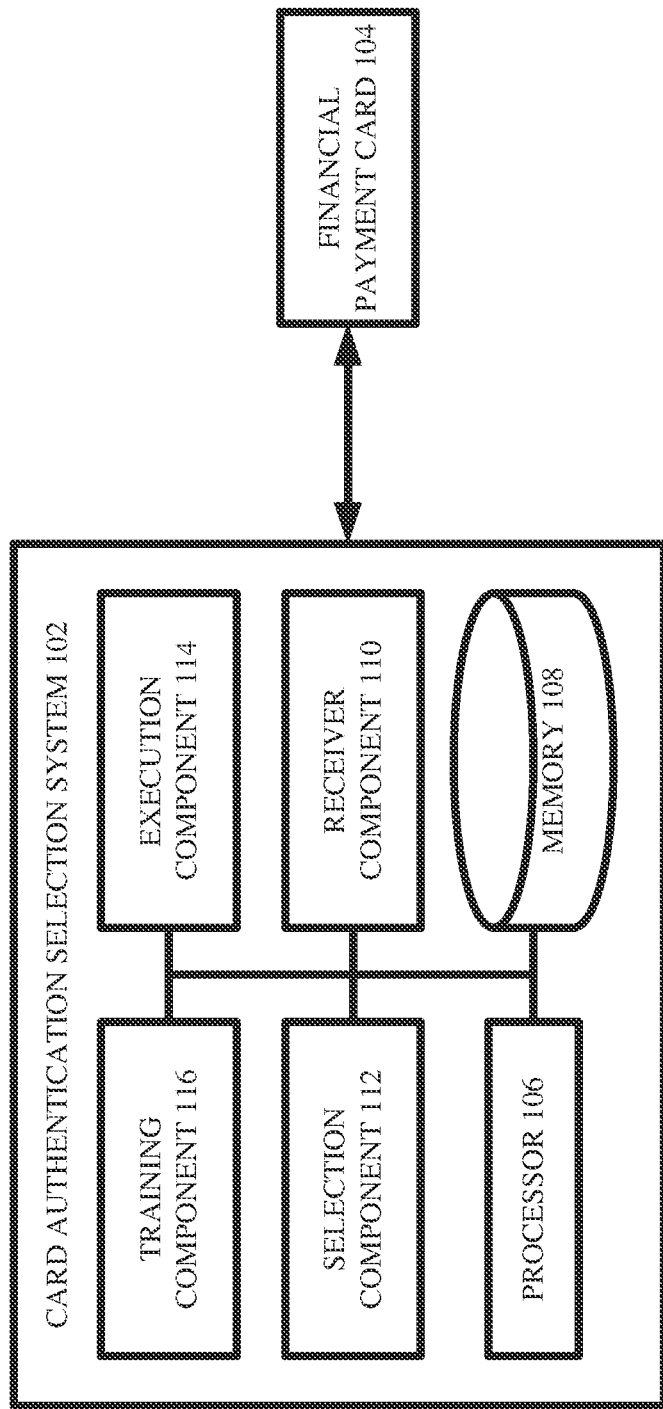
FIG. 1 illustrates a high-level block diagram of an example, non-limiting system that facilitates card authentication technique selection via machine learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Before a financial payment card (e.g., a credit card, a debit card) is accepted by an online financial transaction platform (e.g., PayPal®) or added to an online financial transaction wallet (e.g., a PayPal® wallet), the financial payment card should first be authenticated. In current practice, there exist two different techniques for authenticating financial payment cards: zero-dollar authentication and tokenization authentication. Zero-dollar authentication involves electronically depositing and subsequently withdrawing a small amount of money (e.g., between $0.01 and $0.99, inclusively) to a financial account (e.g., credit card account, debit card account) that is associated with the financial payment card, so as to verify that the financial payment card is legitimate. On the other hand, tokenization authentication involves generating an encrypted token to represent the financial payment card and subsequently querying a financial institution that purportedly issued the financial payment card to verify the encrypted token.

Each of these two different authentication techniques has its own advantages and disadvantages. For instance, although zero-dollar authentication can be considered as highly reliable, it can cost a fixed amount of money to perform for each financial payment card that is desired to be authenticated, and it can be delayed due to the low priority that is often given to small dollar-amount transactions by financial institutions. In contrast, tokenization authentication can cost nothing for each financial payment card that is successfully authenticated, but not all financial institutions recognize tokenization, and tokenization can have a fixed cost for each financial payment card that is unsuccessfully authenticated.

Additionally, for many financial payment cards, both zero-dollar authentication and tokenization authentication can achieve the same authentication result. In other words, for such cards, both authentication techniques yield successful authentications, or both authentication techniques yield unsuccessful authentications. However, for many other financial payment cards, zero-dollar authentication and tokenization authentication can achieve different authentication results. That is, for such cards, one authentication technique can yield a successful authentication while the other authentication technique can yield an unsuccessful authentication.

Unfortunately, there exist no systems or techniques that allow an online financial transaction platform or an online financial transaction wallet to determine which authentication technique to use for a given financial payment card so as to maximize the likelihood of successful authentication and/or to minimize the costs associated with authentication of the given financial payment card.

Accordingly, systems and/or techniques that can address one or more of these problems can be desirable.

Various embodiments described herein can address one or more of these technical problems. One or more embodiments described herein include systems, computer-implemented methods, apparatus, and/or computer program products that can facilitate card authentication technique selection via machine learning. In other words, various embodiments described herein can include a computerized tool (e.g., any suitable combination of computer-executable hardware and/or computer-executable software) that can electronically determine, via execution of one or more machine learning models, which of zero-dollar authentication or tokenization authentications should be applied to a given financial payment card so as to maximize the likelihood of successful authentication and/or so as to minimize the likelihood of unsuccessful authentication.

In various embodiments, a computerized tool as described herein can comprise a receiver component, a selection component, and/or an execution component.

In various embodiments, the receiver component of the computerized tool can electronically receive and/or otherwise electronically access an attribute vector that is associated with a financial payment card. In various instances, the receiver component can electronically retrieve the attribute vector from any suitable centralized and/or decentralized data structure (e.g., graph data structure, relational data structure, hybrid data structure). Accordingly, other components of the computerized tool can electronically interact with (e.g., read, write, edit, manipulate) the attribute vector.

In various aspects, the financial payment card can be any suitable payment card that is linked and/or otherwise mapped to any suitable financial account. As some non-limiting examples, the financial payment card can be a credit card, a debit card, and/or a charge card. Moreover, in various instances, the attribute vector can include any suitable alphanumeric characters and/or elements that describe and/or otherwise represent any suitable attributes of the financial payment card. As some non-limiting examples, such attributes can include an account number and/or card number of the financial payment card, a security code (e.g., a card verification value (CVV)) of the financial payment card, an activation date of the financial payment card, an expiration date of the financial payment card, an identity of the financial institution that issued the financial payment card, an identity of the card network that hosts the financial payment card, and/or an indication of a privilege/reward level of the financial payment card.

In various embodiments, the selection component of the computerized tool can electronically access and/or otherwise electronically control a binary machine learning classifier. In various aspects, the binary machine learning classifier can exhibit any suitable artificial intelligence architecture. For instance, the binary machine learning classifier can be a deep learning neural network, a support vector machine, a tree-based model, and/or a naïve Bayes model. In any case, the binary machine learning classifier can be configured to infer which type of authentication technique has the highest probability of successfully authenticating the financial payment card. More specifically, the binary machine learning classifier can be configured so as to receive as input the attribute vector and so as to produce as output a binary classification label based on the attribute vector. In various instances, the binary classification label can indicate either the zero-dollar authentication technique or the tokenization authentication technique. In other words, the binary classification label can indicate which of zero-dollar authentication or tokenization authentication should be applied to the financial payment card.

In various embodiments, the execution component of the computerized tool can electronically apply, execute, and/or otherwise initiate authentication of the financial payment card according to the binary classification label. That is, if the binary classification label indicates that the financial payment card should be authenticated with zero-dollar authentication, then the execution component can apply, execute, initiate, and/or otherwise facilitate zero-dollar authentication with respect to the financial payment card (e.g., the execution component can attempt to deposit and subsequently withdraw a small amount of funds from the financial account that is purportedly associated with the financial payment card). On the other hand, if the binary classification label instead indicates that the financial payment card should be authenticated with tokenization authentication, then the execution component can apply, execute, initiate, and/or otherwise facilitate tokenization authentication with respect to the financial payment card (e.g., the execution component can cryptographically generate a token to represent the financial payment card and can request a server of the financial institution that purportedly issued the financial payment card to verify the token).

Before the binary machine learning classifier can be deployed and/or executed in inference time, it must first be trained. Accordingly, in various embodiments, the computerized tool can further comprise a training component, which can train the binary machine learning classifier to accurately infer which type of authentication technique to apply to the financial payment card.

More specifically, in various aspects, the receiver component can electronically receive, retrieve, and/or otherwise access a training dataset. In various cases, the training dataset can include a set of training attribute vectors and a respectively corresponding set of authentication technique annotations. In other words, any given training attribute vector in the set of training attribute vectors can respectively correspond to a given authentication technique annotation in the set of authentication technique annotations, where the given training attribute vector can be considered as representing a given financial payment card, and where the given authentication technique annotation can be considered as a ground-truth label that indicates which authentication technique (e.g., zero-dollar vs. tokenization) should be applied to the given financial payment card.

In various instances, the training component can train, in supervised fashion, the binary machine learning classifier on the training dataset. More specifically, the internal parameters (e.g., weight matrices, bias values) of the binary machine learning classifier can be randomly initialized. In various cases, the training component can identify a particular training attribute vector in the training dataset, and the training component can identify a particular authentication technique annotation in the training dataset that corresponds to the particular training attribute vector. In various aspects, the training component can feed the particular training attribute vector to the binary machine learning classifier. This can cause the binary machine learning classifier to produce some output based on the particular training attribute vector (e.g., if the binary machine learning classifier is a neural network, then the particular training attribute vector can complete a forward pass through one or more hidden layers of the binary machine learning classifier, and an output layer of the binary machine learning classifier can generate the output based on activations of the one or more hidden layers). In any case, the output can be considered as representing which authentication technique (e.g., zero-dollar vs. tokenization) that the binary machine learning classifier believes and/or infers should correspond to the particular training attribute vector. In contrast, the particular authentication technique annotation can be considered as representing the ground-truth authentication technique that is known to correspond to the particular training attribute vector. Note that, if the binary machine learning classifier has so far undergone no and/or little training, the output can be very inaccurate. In any case, the training component can compute an error/loss (e.g., cross-entropy) between the output and the particular authentication technique annotation. Accordingly, the training component can update (e.g., via backpropagation) the internal parameters of the binary machine learning classifier, based on the computed error/loss.

In various aspects, the training component can repeat the above procedure for each training attribute vector in the training dataset, with the ultimate result being that the internal parameters of the binary machine learning classifier can become iteratively optimized for accurately inferring authentication techniques based on attribute vectors. Those having ordinary skill in the art will appreciate that any suitable training batch sizes, any suitable number of training epochs, and/or any suitable training termination criteria can be implemented.

Accordingly, various embodiments described herein can be considered as a computerized tool that can utilize a trained machine learning model to infer and/or select which type of authentication technique (e.g., zero-dollar vs. tokenization) should be applied to a given financial payment card. Furthermore, in various cases, the computerized tool can implement and/or apply the inferred/selected authentication technique for the given financial payment card.

Various embodiments described herein can be employed to use hardware and/or software to solve problems that are highly technical in nature (e.g., to facilitate card authentication technique selection via machine learning), that are not abstract and that cannot be performed as a set of mental acts by a human. Further, some of the processes performed can be performed by a specialized computer (e.g., trained machine learning classifiers) for carrying out defined tasks related to card authentication technique selection via machine learning.

For example, some defined tasks of various embodiments described herein can include: accessing, by a processor, an attribute vector associated with a financial payment card; determining, by the processor and via execution of a machine learning model, whether to authenticate the financial payment card with a zero-dollar authentication technique or instead with a tokenization authentication technique; executing, by the processor, the zero-dollar authentication technique with respect to the financial payment card, when the processor determines that the financial payment card should be authenticated with the zero-dollar authentication technique; and executing, by the processor, the tokenization authentication technique with respect to the financial payment card, when the processor determines that the financial payment card should be authenticated with the tokenization authentication technique. In various aspects, the processor can determine, based on the attribute vector and via execution of the machine learning model, whether to authenticate the financial payment card with the zero-dollar authentication technique or instead with the tokenization authentication technique by: inputting, by the processor, the attribute vector associated with the financial payment card to the machine learning model, and the machine learning model can produce as output a binary classification label that indicates either that the financial payment card should be authenticated with the zero-dollar authentication technique or instead that the financial payment card should be authenticated with the tokenization authentication technique.

Such defined tasks are not performed manually by humans. Indeed, neither the human mind nor a human with pen and paper can electronically retrieve an attribute vector that represents a financial payment card, electronically execute a trained machine learning model (e.g., a neural network, a tree-based model) on the attribute vector which can cause the trained machine learning model to produce an outputted classification label that indicates which type of authentication technique (e.g., zero-dollar vs. tokenization) should be applied to the financial payment card, and electronically authenticate the financial payment card in accordance with the outputted classification label. Instead, various embodiments described herein are inherently and inextricably tied to computer technology and cannot be implemented outside of a computing environment (e.g., machine learning models, such as neural networks or tree-based models, are inherently computerized devices that cannot be trained or executed in any sensible, practical, or reasonable way without computers).

In various instances, embodiments described herein can integrate into a practical application the disclosed teachings regarding card authentication technique selection via machine learning. As explained above, there do not exist any systems/techniques that can determine for an online financial transaction platform and/or for an online financial transaction wallet which type of authentication technique (e.g., zero-dollar vs. tokenization) to apply to a given financial payment card, so as to maximize the chances of successful authentication of the given financial payment card. In contrast, various embodiments described herein can address this problem. Specifically, various embodiments described herein can include a computerized tool that can execute a machine learning model on an attribute vector that represents a financial payment card. As described herein, the machine learning model can be trained (e.g., in supervised fashion) to accurately infer which type of authentication technique (e.g., zero-dollar vs. tokenization) would have the highest likelihood of successfully authenticating the financial payment card that is represented by the inputted attribute vector. In various aspects, after inferring which type of authentication technique would have the highest likelihood of success with respect to the financial payment card, the computerized tool can actually execute and/or apply the inferred authentication technique to the financial payment card. Such a computerized tool that can infer which type of authentication technique should be applied to a financial payment card so as to minimize the chances of unsuccessful authentication certainly constitutes a useful and practical application of computers.

Moreover, in various aspects, embodiments described herein can control real-world and/or tangible devices based on the disclosed teachings. For example, a computerized tool as described herein can electronically apply and/or implement a real-world authentication technique (e.g., zero-dollar authentication or tokenization authentication) to a real-world financial payment card (e.g., a credit card, a debit card), based on results generated by a real-world machine learning classifier.

It should be appreciated that the figures described herein are non-limiting examples of various embodiments.

FIG. 1 illustrates a high-level block diagram of an example, non-limiting system 100 that can facilitate card authentication technique selection via machine learning in accordance with one or more embodiments described herein. As shown, a card authentication selection system 102 can be electronically integrated, via any suitable wired and/or wireless electronic connections, with a financial payment card 104.

In various embodiments, the financial payment card 104 can be any suitable type of card that can serve as a financial instrument and that can be associated and/or otherwise linked with a corresponding financial account. For example, the financial payment card 104 can be a credit card that is associated with a credit account of a user/customer. As another example, the financial payment card 104 can be a debit card that is associated with a debit account of a user/customer. As still another example, the financial payment card 104 can be a charge card that is associated with a charge account of a user/customer.

In various cases, it can be desired to authenticate the financial payment card 104, either with zero-dollar authentication or with tokenization authentication. However, it can also be desired to avoid an unnecessary authentication failure. Accordingly, the goal can be to identify which of zero-dollar authentication or tokenization authentication should be applied to the financial payment card 104 so as to maximize the likelihood of successful authentication. In various cases, the card authentication selection system 102 can facilitate such functionality, as described herein.

In various embodiments, the card authentication selection system 102 can comprise a processor 106 (e.g., computer processing unit, microprocessor) and a computer-readable memory 108 that is operably coupled to the processor 106. The memory 108 can store computer-executable instructions which, upon execution by the processor 106, can cause the processor 106 and/or other components of the card authentication selection system 102 (e.g., receiver component 110, selection component 112, execution component 114, training component 116) to perform one or more acts. In various embodiments, the memory 108 can store computer-executable components (e.g., receiver component 110, selection component 112, execution component 114, training component 116), and the processor 106 can execute the computer-executable components.

In various embodiments, the card authentication selection system 102 can comprise a receiver component 110, a selection component 112, an execution component 114, and/or a training component 116. In various aspects, as described herein, the receiver component 110 can electronically receive an attribute vector that defines, describes, and/or otherwise corresponds to the financial payment card 104. In various instances, as described herein, the selection component 112 can electronically execute one or more machine learning models on the attribute vector, which can cause the one or more machine learning models to identify as output which authentication technique (e.g., zero-dollar vs. tokenization) should be applied to the financial payment card 104. In various cases, as described herein, the execution component 114 can electronically execute, implement, and/or facilitate the authentication technique that is identified by the one or more machine learning models. In various aspects, as described herein, the training component 116 can electronically train the one or more machine learning models, so that the one or more machine learning models can accurately infer and/or select authentication techniques based on inputted attribute vectors.

Figure 2:
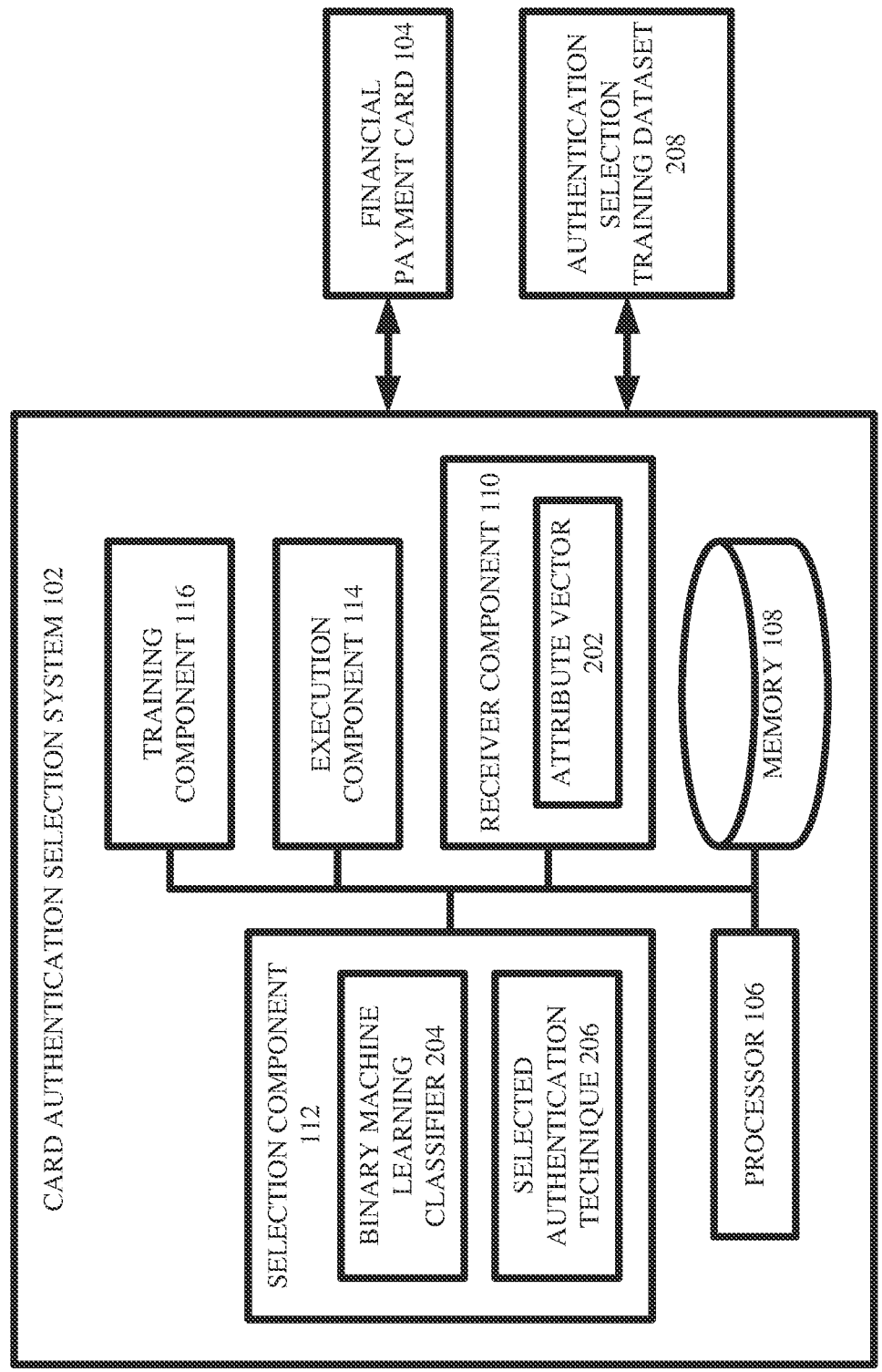
FIG. 2 illustrates a high-level block diagram of an example, non-limiting system including a binary machine learning classifier that facilitates card authentication technique selection via machine learning in accordance with one or more embodiments described herein.

FIG. 2 illustrates a high-level block diagram of an example, non-limiting system 200 including a binary machine learning classifier that can facilitate card authentication technique selection via machine learning in accordance with one or more embodiments described herein. As shown, the system 200 can, in some cases, comprise the same components as the system 100, and can further comprise an attribute vector 202, a binary machine learning classifier 204, a selected authentication technique 206, and/or an authentication selection training dataset 208.

In various embodiments, the receiver component 110 can electronically receive and/or otherwise electronically access the attribute vector 202. In various aspects, the receiver component 110 can electronically retrieve the attribute vector 202 from any suitable computing device (not shown) and/or from any suitable centralized and/or decentralized data structure (not shown), as desired. In any case, the receiver component 110 can electronically obtain and/or access the attribute vector 202, such that other components of the card authentication selection system 102 can electronically interact with the attribute vector 202.

In various aspects, the attribute vector 202 can have any suitable dimensionality (e.g., can be a vector having any suitable number of elements). In various instances, the elements of the attribute vector 202 can be any suitable alphanumeric characters that represent and/or otherwise indicate any suitable attributes of the financial payment card 104. As an example, an attribute of the financial payment card 104 can be an account number and/or card number (e.g., 16-digit credit card number) of the financial payment card 104. As another example, an attribute of the financial payment card 104 can be a security code (e.g., CVV) of the financial payment card 104. As still another example, an attribute of the financial payment card 104 can be an activation date of the financial payment card 104. As yet another example, an attribute of the financial payment card 104 can be an expiration date of the financial payment card 104. As even another example, an attribute of the financial payment card 104 can be an identity (e.g., bank identification number (BIN)) of a financial institution (e.g., a bank) that issued the financial payment card 104. As another example, an attribute of the financial payment card 104 can be identity of a financial payment card network (e.g., Visa®, Discover®, MasterCard®) that hosts the financial payment card 104. As still another example, an attribute of the financial payment card 104 can be a privilege level and/or reward level (e.g., cash-back credit card vs. secured credit card) of the financial payment card 104. As yet another example, an attribute of the financial payment card 104 can be a pinless flag of the financial payment card 104. As even another example, an attribute of the financial payment card 104 can be an address (e.g., country, state/province, city, street, building number) of the financial payment card 104. As those having ordinary skill in the art will appreciate, the attribute vector 202 can contain and/or represent any suitable combination of the aforementioned and/or any other suitable attributes of the financial payment card 104, as desired.

Although the herein disclosure describes the attribute vector 202 as being a vector (e.g., a row vector and/or column vector), this is a mere non-limiting example. Those having ordinary skill in the art will appreciate that the attribute vector 202 can, in various aspects, exhibit any suitable format (e.g., can be one or more scalars, one or more vectors, one or more matrices, one or more tensors, one or more character strings, and/or any suitable combination thereof).

In various embodiments, the selection component 112 can electronically store, electronically maintain, electronically control, and/or otherwise electronically access the binary machine learning classifier 204. In various aspects, the binary machine learning classifier 204 can exhibit any suitable artificial intelligence architecture, as desired. For example, the binary machine learning classifier 204 can exhibit a deep learning neural network architecture. In such case, the binary machine learning classifier 204 can include any suitable number of layers (e.g., input layer, one or more hidden layers, output layer), can include any suitable numbers of neurons in various layers (e.g., different layers can have the same and/or different numbers of neurons as each other), can include any suitable activation functions in various neurons (e.g., sigmoid, softmax, hyperbolic tangent, rectified linear unit), and/or can include any suitable interneuron connections (e.g., forward connections, skip connections, recurrent connections). As another example, the binary machine learning classifier 204 can exhibit any suitable tree-based architecture. For instance, in such cases, the binary machine learning classifier 204 can be an XG Boost model or a random forest model. In various instances, the binary machine learning classifier 204 can exhibit any other suitable artificial intelligence architecture (e.g., support vector machine, naïve Bayes, logistic and/or linear regression).

Figure 3:
FIG. 3 illustrates an example, non-limiting block diagram showing how a binary machine learning classifier can select a card authentication technique in accordance with one or more embodiments described herein.

In any case, the selection component 112 can electronically feed as input the attribute vector 202 to the binary machine learning classifier 204, and the binary machine learning classifier 204 can identify as output the selected authentication technique 206, as shown in FIG. 3. For example, if the binary machine learning classifier 204 is a neural network, then the selection component 112 can feed the attribute vector 202 to an input layer of the binary machine learning classifier 204, the attribute vector 202 can complete a forward pass through one or more hidden layers of the binary machine learning classifier 204, and an output layer of the binary machine learning classifier 204 can produce as output a binary classification based on activations of the one or more hidden layers. In various instances, the binary classification can identify one of zero-dollar authentication or tokenization authentication. In other words, the binary classification can identify which of zero-dollar authentication or tokenization authentication should be applied to the financial payment card 104 (e.g., which of zero-dollar authentication or tokenization authentication is more likely to achieve a successful authentication of the financial payment card 104 and/or is more likely to avoid an unsuccessful authentication of the financial payment card 104). In various aspects, the particular authentication technique that is identified by the binary classification produced by the binary machine learning classifier 204 can be referred to as the selected authentication technique 206.

In various embodiments, the execution component 114 can electronically execute, electronically apply, electronically implement, electronically initiate, and/or otherwise electronically facilitate the selected authentication technique 206 with respect to the financial payment card 104. For example, if the selected authentication technique 206 is zero-dollar authentication, then the execution component 114 can electronically perform zero-dollar authentication so as to verify and/or invalidate the financial payment card 104 (e.g., the execution component 114 can attempt to deposit and subsequently withdraw an amount of money that is less than one dollar from the financial account that purportedly corresponds to the financial payment card 104). On the other hand, if the selected authentication technique 206 is tokenization authentication, then the execution component 114 can electronically perform tokenization authentication so as to verify and/or invalidate the financial payment card 104 (e.g., the execution component 114 can generate an encrypted token to represent the financial payment card 104 and can request a server of the financial institution that purportedly issued the financial payment card 104 to verify the encrypted token).

In order for the binary machine learning classifier 204 to be able to accurately infer the selected authentication technique 206 based on the attribute vector 202, the binary machine learning classifier 204 should first undergo training. In various embodiments, the receiver component 110 can electronically receive, retrieve, and/or otherwise access, from any suitable centralized and/or decentralized data structure (not shown), the authentication selection training dataset 208, and the training component 116 can electronically train the binary machine learning classifier 204 based on the authentication selection training dataset 208.

Figure 4:
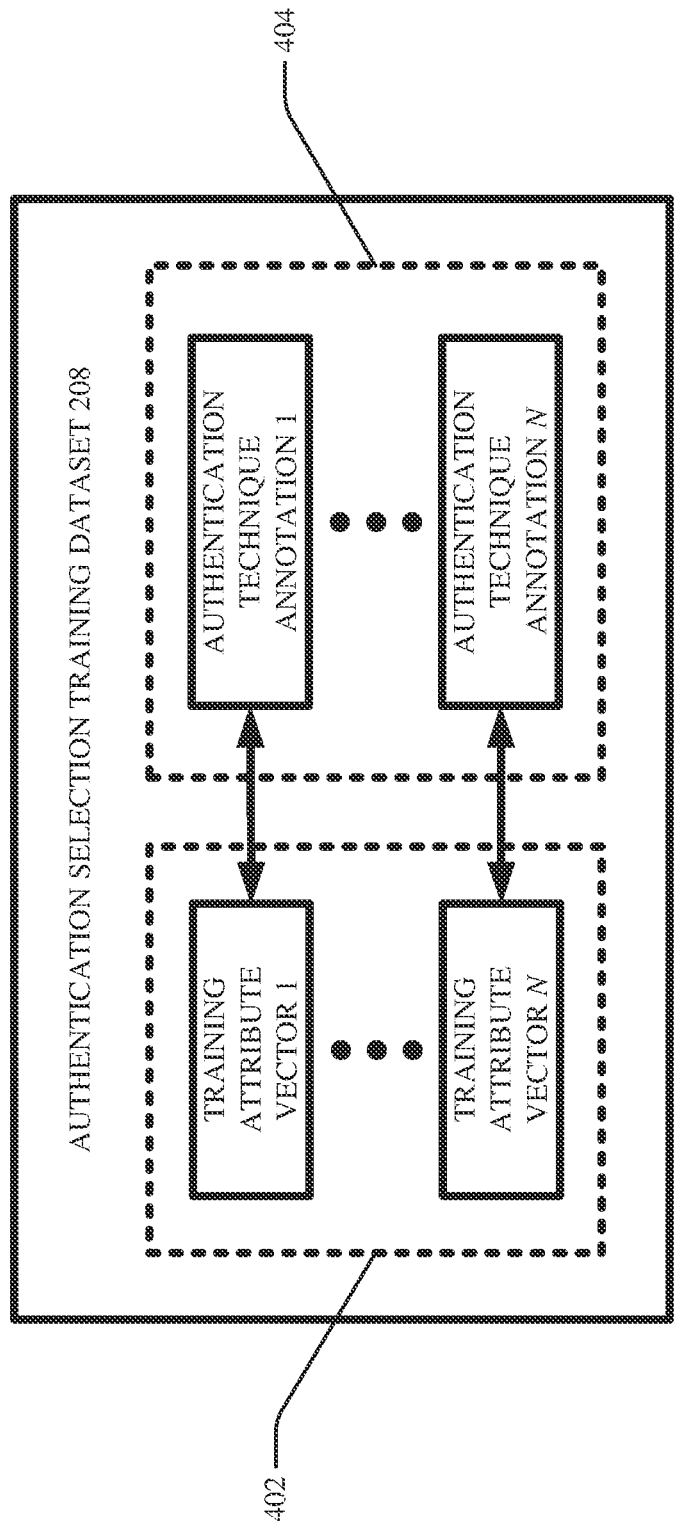
FIGS. 4-5 illustrate example, non-limiting block diagrams showing how a binary machine learning classifier can be trained to select card authentication techniques in accordance with one or more embodiments described herein.

As shown in FIG. 4, the authentication selection training dataset 208 can, in various embodiments, include a set of training attribute vectors 402 and a set of authentication technique annotations 404. In various aspects, the set of training attribute vectors 402 can include n attribute vectors, for any suitable positive integer n: a training attribute vector 1 to a training attribute vector n. In various instances, the set of authentication technique annotations 404 can likewise include n annotations: an authentication technique annotation 1 to an authentication technique annotation n. Accordingly, the set of authentication technique annotations 404 can be considered as respectively corresponding to the set of training attribute vectors 402.

For example, as shown, the training attribute vector 1 can correspond to the authentication technique annotation 1. In various aspects, the training attribute vector 1 can be considered as representing and/or otherwise indicating any suitable attributes of a particular financial payment card, and the authentication technique annotation 1 can be considered as representing the specific authentication technique (e.g., zero-dollar or tokenization) that should be applied to that particular financial payment card (e.g., representing the authentication technique that would have the highest probability of successfully authenticating that particular financial payment card and/or that would have the lowest probability of failing to authenticate that particular financial payment card). In other words, the authentication technique annotation 1 can be considered as a ground-truth training label that is known to correspond to the training attribute vector 1.

Similarly, as shown, the training attribute vector n can correspond to the authentication technique annotation n. In various aspects, the training attribute vector n can be considered as representing and/or otherwise indicating any suitable attributes of a given financial payment card, and the authentication technique annotation n can be considered as representing the specific authentication technique (e.g., zero-dollar or tokenization) that should be applied to that given financial payment card (e.g., representing the authentication technique that would have the highest probability of successfully authenticating that given financial payment card and/or that would have the lowest probability of failing to authenticate that given financial payment card). In other words, the authentication technique annotation n can be considered as a ground-truth training label that is known to correspond to the training attribute vector n.

Figure 5:
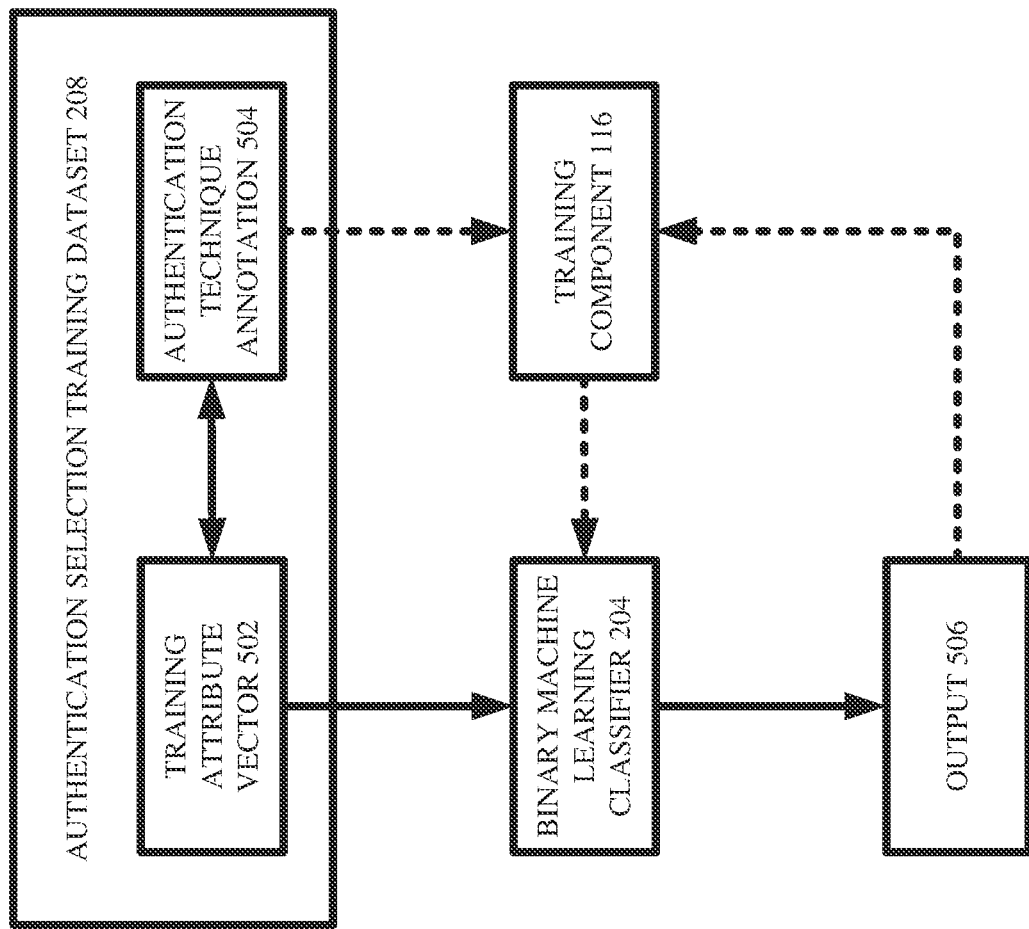

As shown in FIG. 5, the training component 116 can electronically train, in supervised fashion, the binary machine learning classifier 204 on the authentication selection training dataset 208. More specifically, in various aspects, the internal parameters (e.g., weight matrices, bias values) of the binary machine learning classifier 204 can be initialized in any suitable fashion (e.g., randomly initialized). In various instances, the training component 116 can electronically select a training attribute vector 502 from the authentication selection training dataset 208. Accordingly, the training component 116 can electronically identify, in the authentication selection training dataset 208, an authentication technique annotation 504 that corresponds to the training attribute vector 502. In various cases, the training component 116 can electronically feed the training attribute vector 502 to the binary machine learning classifier 204 as input. In various aspects, this can cause the binary machine learning classifier 204 to produce an output 506 based on the training attribute vector 502. As a non-limiting example, suppose that the binary machine learning classifier 204 is a deep learning model. In such case, an input layer of the binary machine learning classifier 204 can receive the training attribute vector 502. In various instances, the training attribute vector 502 can complete a forward pass through one or more hidden layers of the binary machine learning classifier 204 according to the interneuron connections of the binary machine learning classifier 204 (e.g., forward connections, skip connections, recurrent connections). Finally, in various aspects, an output layer of the binary machine learning classifier 204 can compute the output 506, based on activations provided by the one or more hidden layers. In any case, the output 506 can be considered as one or more scalars, one or more vectors, one or more matrices, one or more tensors, and/or one or more character strings that binarily identify either zero-dollar authentication or tokenization authentication. In other words, the output 506 can be considered as a binary classification label that indicates which one of zero-dollar authentication or tokenization authentication that the binary machine learning classifier 204 believes/infers would have the highest chance of successfully authenticating a financial payment card that is represented by the training attribute vector 502. In contrast, the authentication technique annotation 504 can be considered as indicating in ground-truth fashion which one of zero-dollar authentication or tokenization authentication is known to have the highest chance of successfully authenticating the financial payment card that is represented by the training attribute vector 502. Note that, if the binary machine learning classifier 204 has so far undergone no and/or little training, then the output 506 can be quite inaccurate. In any case, the training component 116 can compute an error/loss (e.g., cross-entropy) between the output 506 and the authentication technique annotation 504. In various aspects, the training component 116 can then update (e.g., via backpropagation) the internal parameters of the binary machine learning classifier 204, based on the computed error/loss.

In various aspects, the training component 116 can repeat the above-described training procedure for each of the training attribute vectors in the authentication selection training dataset 208, with the ultimate result being that the internal parameters of the binary machine learning classifier 204 can become iteratively optimized for accurately inferring and/or selecting authentication techniques based on inputted attribute vectors. Those having ordinary skill in the art will appreciate that any suitable training batch sizes, any suitable number of training epochs, any suitable error/loss functions, and/or any suitable training termination criteria can be implemented by the training component 116.

Figure 6:
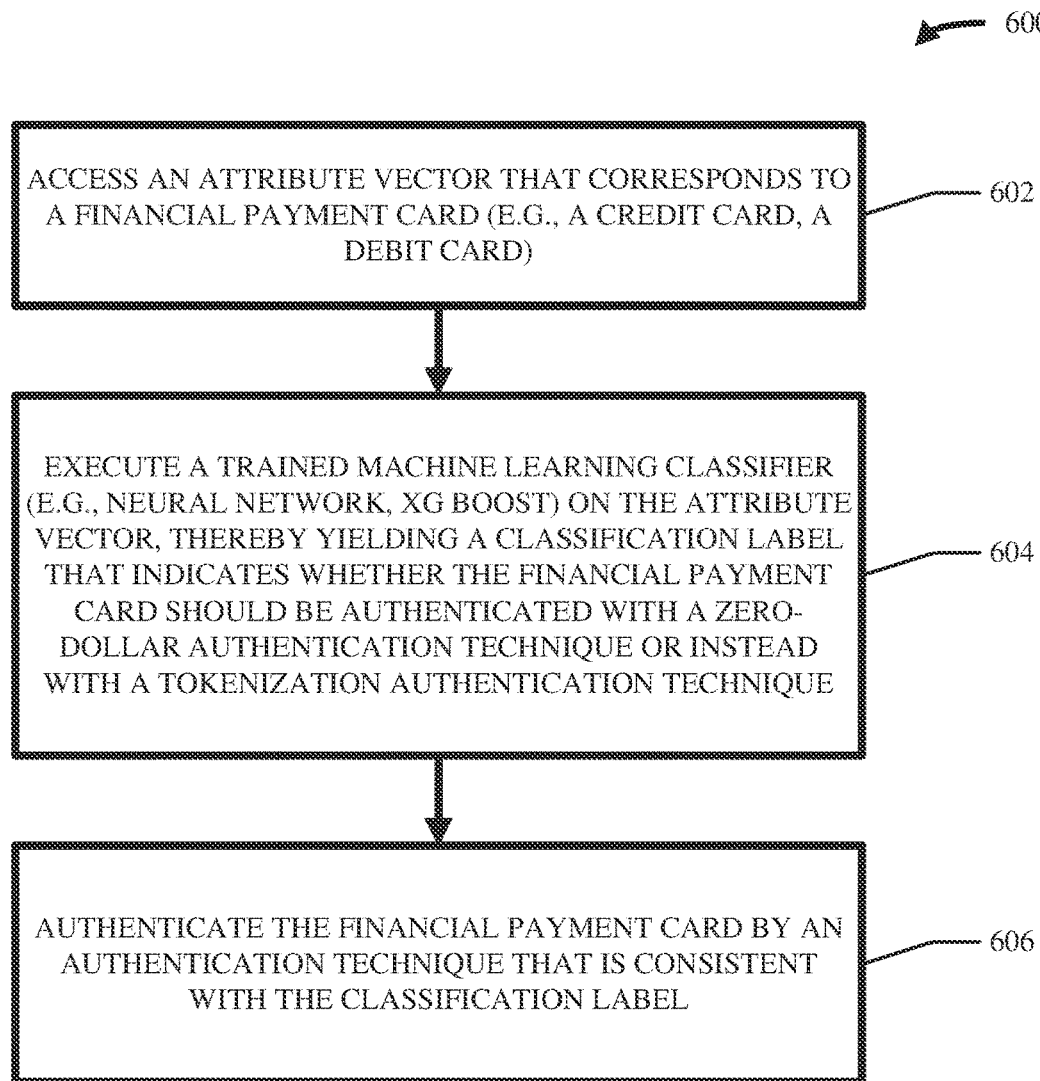
FIG. 6 illustrates a high-level flow diagram of an example, non-limiting computer-implemented method that facilitates card authentication technique selection via machine learning in accordance with one or more embodiments described herein.

FIG. 6 illustrates a high-level flow diagram of an example, non-limiting computer-implemented method 600 that can facilitate card authentication technique selection via machine learning in accordance with one or more embodiments described herein. In various cases, the card authentication selection system 102 can facilitate the computer-implemented method 600.

In various embodiments, act 602 can include accessing, by a computerized system (e.g., via 110), an attribute vector (e.g., 202) that corresponds to a financial payment card (e.g., 104). In various cases, the financial payment card can be a credit card and/or a debit card.

In various aspects, act 604 can include executing, by the computerized system (e.g., via 112), a trained machine learning classifier (e.g., 204) on the attribute vector. This can yield a classification label (e.g., 206) that indicates whether the financial payment card should be authenticated with a zero-dollar authentication technique or instead with a tokenization authentication technique. In various cases, the trained machine learning classifier can exhibit any suitable structure/architecture, such as a neural network structure and/or an XG Boost structure.

In various instances, act 606 can include authenticating, by the computerized system (e.g., via 114), the financial payment card by an authentication technique that is consistent with the classification label (e.g., if the classification label indicates zero-dollar authentication, then apply zero-dollar authentication; if the classification label instead indicates tokenization authentication, then apply tokenization authentication).

Although various embodiments described above mainly depict the selection component 112 as accessing and/or controlling one machine learning model (e.g., 204), this is a mere non-limiting example. In various embodiments, the selection component 112 can access and/or control any suitable number of machine learning models to accomplish the above-described functionality. A non-limiting example is shown in FIG. 7.

Figure 7:
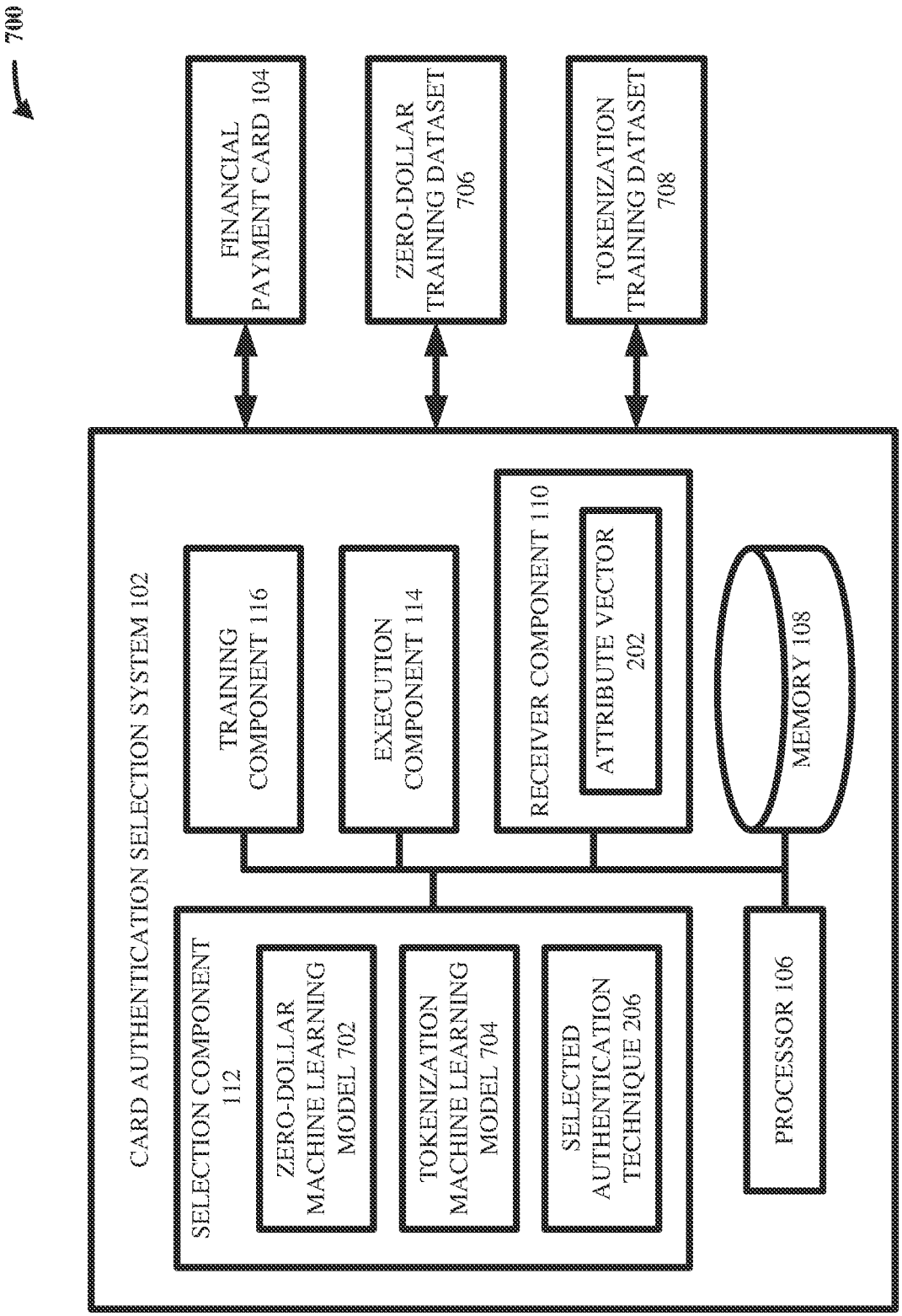
FIG. 7 illustrates a high-level block diagram of an example, non-limiting system including a zero-dollar machine learning model and a tokenization machine learning model that facilitates card authentication technique selection via machine learning in accordance with one or more embodiments described herein.

FIG. 7 illustrates a high-level block diagram of an example, non-limiting system 700 including a zero-dollar machine learning model and a tokenization machine learning model that can facilitate card authentication technique selection via machine learning in accordance with one or more embodiments described herein. As shown, the system 700 can, in some cases, comprise the same components as the system 200, and can further comprise a zero-dollar machine learning model 702 and a tokenization machine learning model 704, in place of the binary machine learning classifier 204, and can comprise a zero-dollar training dataset 706 and a tokenization training dataset 708, in place of the authentication selection training dataset 208.

In various embodiments, as shown, the selection component 112 can electronically store, electronically maintain, electronically control, and/or otherwise electronically access the zero-dollar machine learning model 702. In various aspects, the zero-dollar machine learning model 702 can exhibit any suitable artificial intelligence architecture, as desired. For example, the zero-dollar machine learning model 702 can exhibit a deep learning neural network architecture. In such case, the zero-dollar machine learning model 702 can include any suitable number of layers, can include any suitable numbers of neurons in various layers, can include any suitable activation functions in various neurons, and/or can include any suitable interneuron connections. As another example, the zero-dollar machine learning model 702 can exhibit any suitable tree-based architecture, such as an XG Boost model or a random forest model. In various instances, the zero-dollar machine learning model 702 can exhibit any other suitable artificial intelligence architecture (e.g., support vector machine, naïve Bayes, logistic and/or linear regression).

Similarly, as shown, the selection component 112 can electronically store, electronically maintain, electronically control, and/or otherwise electronically access the tokenization machine learning model 704. In various aspects, the tokenization machine learning model 704 can exhibit any suitable artificial intelligence architecture, as desired. For example, the tokenization machine learning model 704 can exhibit a deep learning neural network architecture (e.g., the tokenization machine learning model 704 can include any suitable number of layers, can include any suitable numbers of neurons in various layers, can include any suitable activation functions in various neurons, and/or can include any suitable interneuron connections). As another example, the tokenization machine learning model 704 can exhibit any suitable tree-based architecture (e.g., XG Boost, random forest). In various instances, the tokenization machine learning model 704 can exhibit any other suitable artificial intelligence architecture (e.g., support vector machine, naïve Bayes, logistic and/or linear regression).

In any case, the selection component 112 can electronically feed as input the attribute vector 202 to the zero-dollar machine learning model 702, and the zero-dollar machine learning model 702 can predict as output a first probability that the financial payment card 104 would be successfully authenticated by zero-dollar authentication. Likewise, the selection component 112 can electronically feed as input the attribute vector 202 to the tokenization machine learning model 704, and the tokenization machine learning model 704 can predict as output a second probability that the financial payment card 104 would be successfully authenticated by tokenization authentication. Accordingly, the selection component 112 can identify the selected authentication technique 206 based on the first probability generated by the zero-dollar machine learning model 702 and based on the second probability generated by the tokenization machine learning model 704. This is shown in more detail with respect to FIG. 8.

Figure 8:
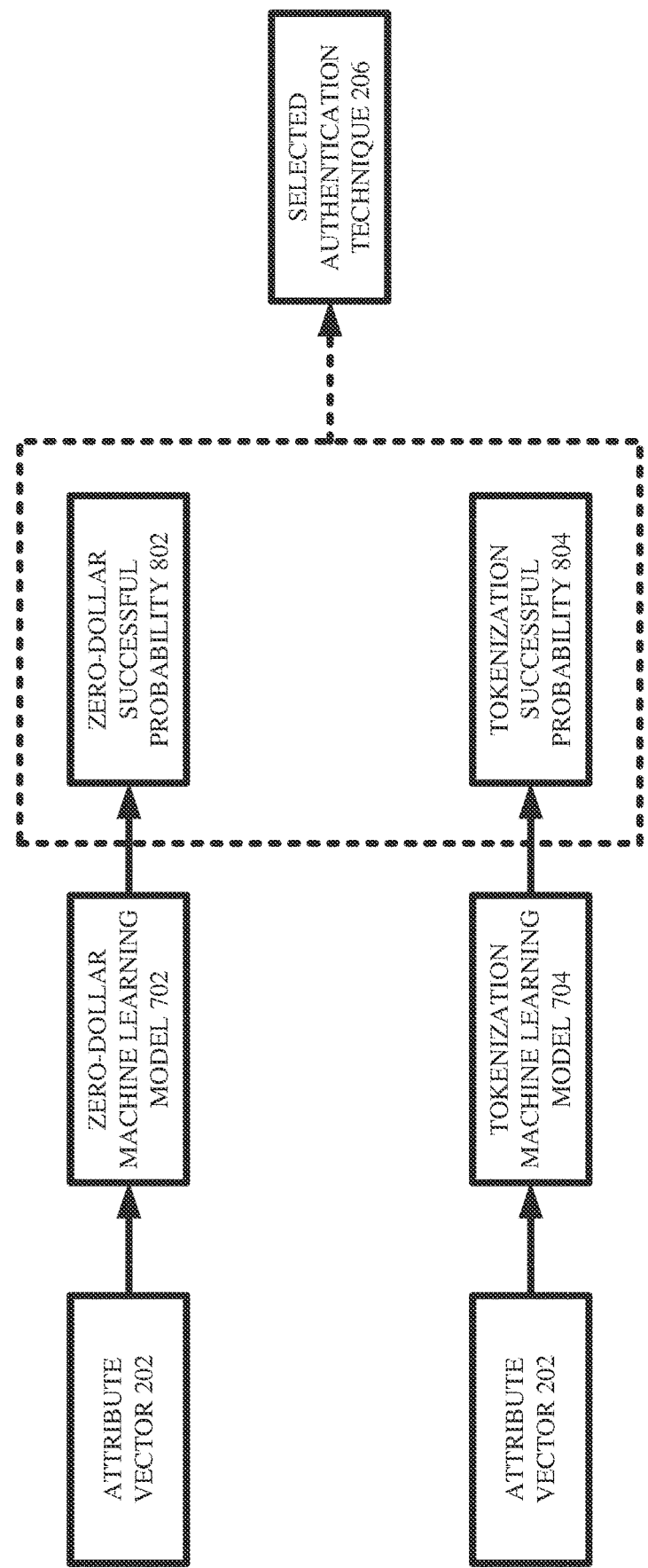
FIG. 8 illustrates an example, non-limiting block diagram showing how a zero-dollar machine learning model and a tokenization machine learning model can collectively select a card authentication technique in accordance with one or more embodiments described herein.

As shown in FIG. 8, the selection component 112 can electronically feed the attribute vector 202 as input to the zero-dollar machine learning model 702. This can cause the zero-dollar machine learning model 702 to produce as output a zero-dollar successful probability 802. For example, if the zero-dollar machine learning model 702 is a neural network, then the selection component 112 can feed the attribute vector 202 to an input layer of the zero-dollar machine learning model 702, the attribute vector 202 can complete a forward pass through one or more hidden layers of the zero-dollar machine learning model 702, and an output layer of the zero-dollar machine learning model 702 can produce as output a scalar based on activations of the one or more hidden layers, where such scalar represents the probability and/or likelihood that the financial payment card 104 would be successfully authenticated if zero-dollar authentication were applied.

Also as shown in FIG. 8, the selection component 112 can electronically feed the attribute vector 202 as input to the tokenization machine learning model 704. This can cause the tokenization machine learning model 704 to produce as output a tokenization successful probability 804. For instance, if the tokenization machine learning model 704 is a neural network, then the selection component 112 can feed the attribute vector 202 to an input layer of the tokenization machine learning model 704, the attribute vector 202 can complete a forward pass through one or more hidden layers of the tokenization machine learning model 704, and an output layer of the tokenization machine learning model 704 can produce as output a scalar based on activations of the one or more hidden layers, where such scalar represents the probability and/or likelihood that the financial payment card 104 would be successfully authenticated if tokenization authentication were applied.

In various aspects, the selection component 112 can then identify the selected authentication technique 206 based on the zero-dollar successful probability 802 and the tokenization successful probability 804. More specifically, the selection component 112 can electronically compare the magnitude of the zero-dollar successful probability 802 to that of the tokenization successful probability 804. When the zero-dollar successful probability 802 is greater than the tokenization successful probability 804, the selection component 112 can identify zero-dollar authentication as the selected authentication technique 206. On the other hand, when the zero-dollar successful probability 802 is lesser than the tokenization successful probability 804, the selection component 112 can identify tokenization authentication as the selected authentication technique 206. If the zero-dollar successful probability 802 is equal to the tokenization successful probability 804, then the selection component 112 can identify either zero-dollar authentication or tokenization authentication as the selected authentication technique 206.

Although the zero-dollar machine learning model 702 and the tokenization machine learning model 704 are described above as being configured to predict the probability of successfully authenticating the financial payment card 104 via zero-dollar authentication or tokenization authentication, respectively, this is a mere non-limiting example. Those having ordinary skill in the art will appreciate that, in some embodiments, the zero-dollar machine learning model 702 can be configured to predict the probability of failing to authenticate the financial payment card 104 by zero-dollar authentication, and the tokenization machine learning model 704 can be configured to predict the probability of failing to authenticate the financial payment card 104 by tokenization authentication. In such case, the selection component 112 can identify as the selected authentication technique 206 that authentication technique which has the lower probability of failure with respect to the financial payment card 104.

As described above, once the selection component 112 identifies the selected authentication technique 206, the execution component 114 can electronically facilitate and/or implement the selected authentication technique 206 on the financial payment card 104.

In order for the zero-dollar machine learning model 702 and the tokenization machine learning model 704 to be able to accurately predict the probabilities of success of zero-dollar authentication and tokenization authentication, respectively, the zero-dollar machine learning model 702 and the tokenization machine learning model 704 should first undergo training. In various embodiments, the receiver component 110 can electronically receive, retrieve, and/or otherwise access, from any suitable centralized and/or decentralized data structure (not shown), the zero-dollar training dataset 706 and the tokenization training dataset 708, and the training component 116 can electronically train the zero-dollar machine learning model 702 and the tokenization machine learning model 704 based on the zero-dollar training dataset 706 and the tokenization training dataset 708, respectively.

Figure 9:
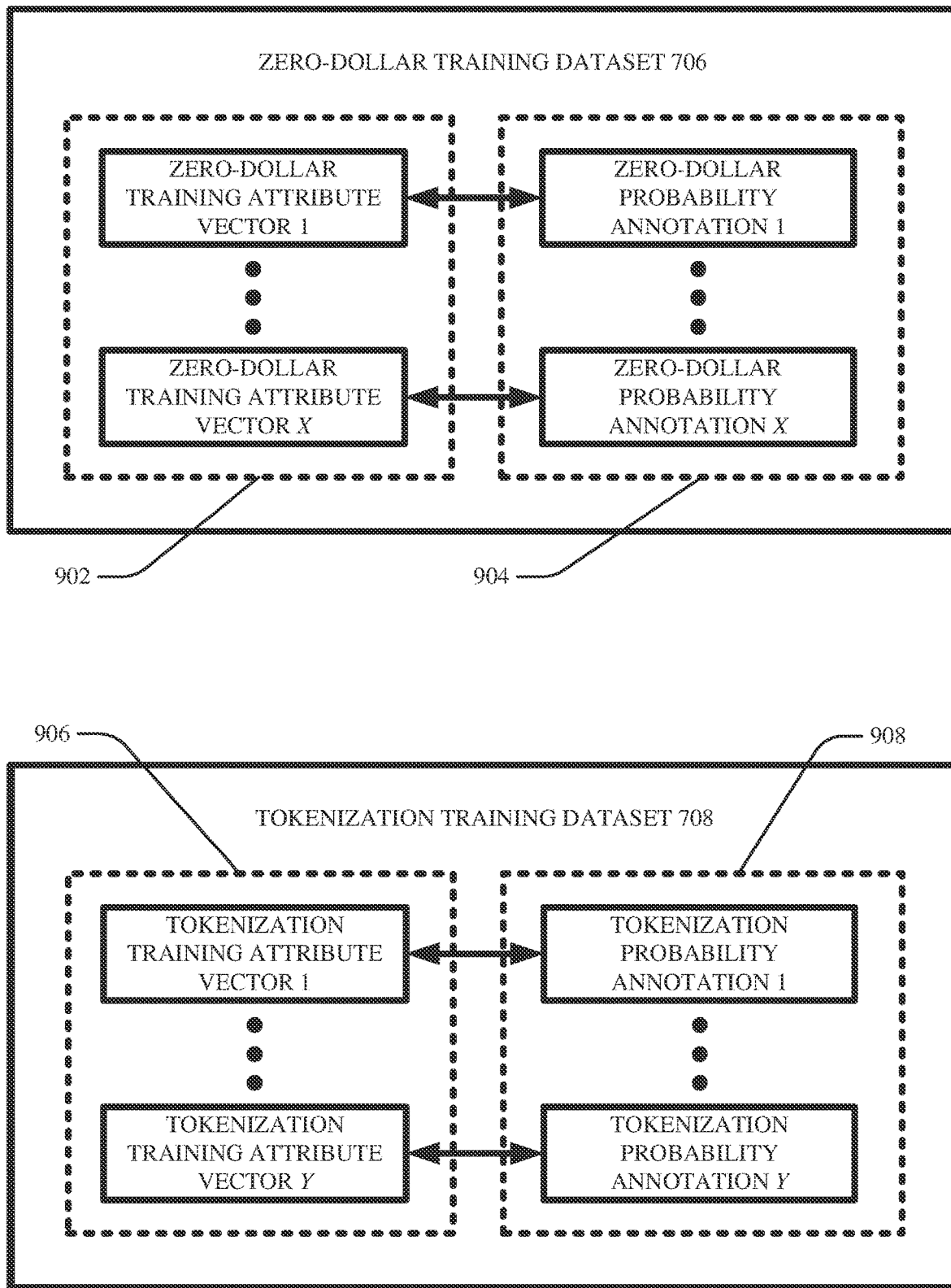
FIGS. 9-11 illustrate example, non-limiting block diagrams showing how a zero-dollar machine learning model and a tokenization machine learning model can be trained in accordance with one or more embodiments described herein.

As shown, in FIG. 9, the zero-dollar training dataset 706 can, in various embodiments, include a set of zero-dollar training attribute vectors 902 and a set of zero-dollar probability annotations 904. In various aspects, the set of zero-dollar training attribute vectors 902 can include x attribute vectors, for any suitable positive integer x: a zero-dollar training attribute vector 1 to a zero-dollar training attribute vector x. In various instances, the set of zero-dollar probability annotations 904 can likewise include x annotations: a zero-dollar probability annotation 1 to a zero-dollar probability annotation x. Accordingly, the set of zero-dollar probability annotations 904 can be considered as respectively corresponding to the set of zero-dollar training attribute vectors 902.

For example, as shown, the zero-dollar training attribute vector 1 can correspond to the zero-dollar probability annotation 1. In various aspects, the zero-dollar training attribute vector 1 can be considered as representing and/or otherwise indicating any suitable attributes of a particular financial payment card, and the zero-dollar probability annotation 1 can be considered as representing the probability of successfully authenticating that particular financial payment card via zero-dollar authentication (e.g., the probability can be any value between 0% and 100%, inclusively). In other words, the zero-dollar probability annotation 1 can be considered as a ground-truth training annotation that is known to correspond to the zero-dollar training attribute vector 1.

Similarly, as shown, the zero-dollar training attribute vector x can correspond to the zero-dollar probability annotation x. In various aspects, the zero-dollar training attribute vector x can be considered as representing and/or otherwise indicating any suitable attributes of a given financial payment card, and the zero-dollar probability annotation x can be considered as representing the probability of successfully authenticating that given financial payment card via zero-dollar authentication (e.g., the probability can be any value between 0% and 100%, inclusively). In other words, the zero-dollar probability annotation x can be considered as a ground-truth training annotation that is known to correspond to the zero-dollar training attribute vector x.

As also shown in FIG. 9, the tokenization training dataset 708 can, in various embodiments, include a set of tokenization training attribute vectors 906 and a set of tokenization probability annotations 908. In various aspects, the set of tokenization training attribute vectors 906 can include y attribute vectors, for any suitable positive integer y: a tokenization training attribute vector 1 to a tokenization training attribute vector y. In various instances, the set of tokenization probability annotations 908 can likewise include y annotations: a tokenization probability annotation 1 to a tokenization probability annotation y. Accordingly, the set of tokenization probability annotations 908 can be considered as respectively corresponding to the set of tokenization training attribute vectors 906.

For example, as shown, the tokenization training attribute vector 1 can correspond to the tokenization probability annotation 1. In various aspects, the tokenization training attribute vector 1 can be considered as representing and/or otherwise indicating any suitable attributes of a particular financial payment card, and the tokenization probability annotation 1 can be considered as representing the probability of successfully authenticating that particular financial payment card via tokenization authentication (e.g., the probability can be any value between 0% and 100%, inclusively). In other words, the tokenization probability annotation 1 can be considered as a ground-truth training annotation that is known to correspond to the tokenization training attribute vector 1.

Likewise, as shown, the tokenization training attribute vector y can correspond to the tokenization probability annotation y. In various aspects, the tokenization training attribute vector y can be considered as representing and/or otherwise indicating any suitable attributes of a given financial payment card, and the tokenization probability annotation y can be considered as representing the probability of successfully authenticating that given financial payment card via tokenization authentication (e.g., the probability can be any value between 0% and 100%, inclusively). In other words, the tokenization probability annotation y can be considered as a ground-truth training annotation that is known to correspond to the tokenization training attribute vector y.

Figure 10:
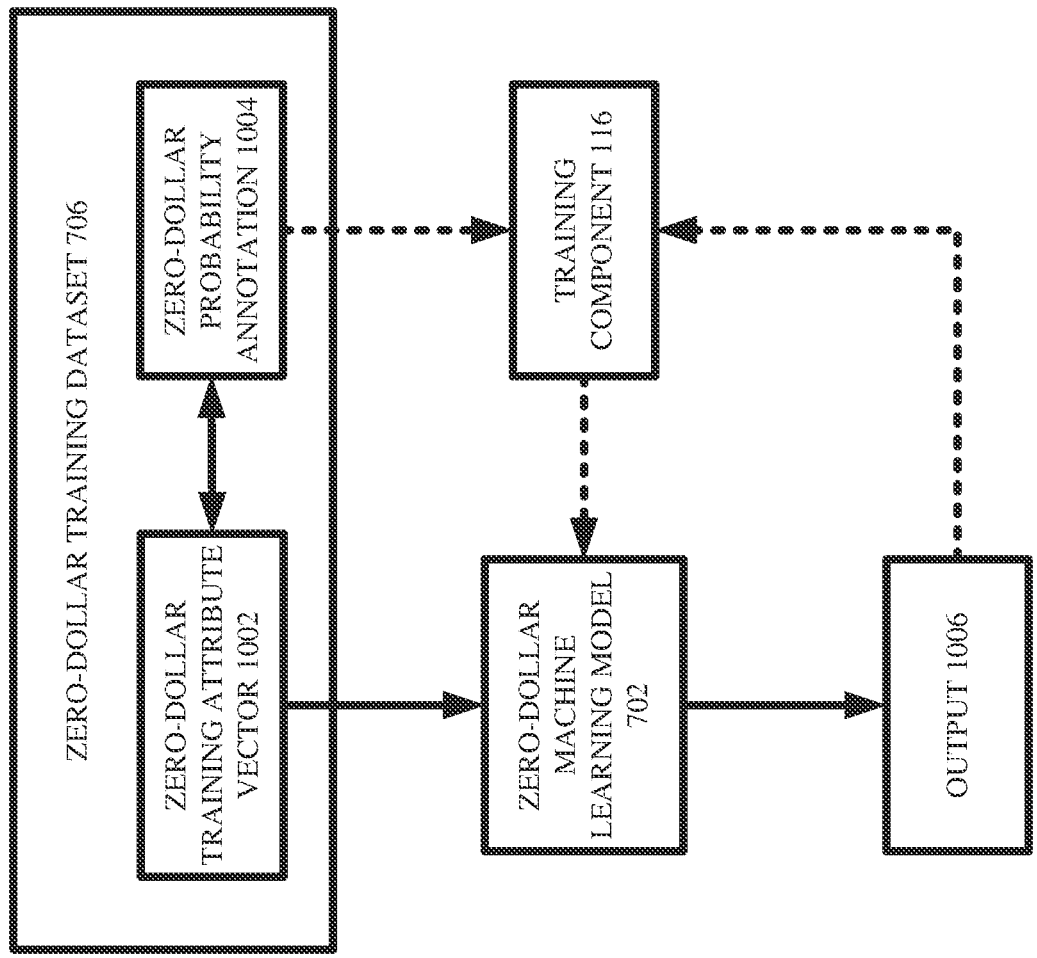

As shown in FIG. 10, the training component 116 can electronically train, in supervised fashion, the zero-dollar machine learning model 702 on the zero-dollar training dataset 706. More specifically, in various aspects, the internal parameters (e.g., weight matrices, bias values) of the zero-dollar machine learning model 702 can be initialized in any suitable fashion (e.g., randomly initialized). In various instances, the training component 116 can electronically select a zero-dollar training attribute vector 1002 from the zero-dollar training dataset 706. Accordingly, the training component 116 can electronically identify, in the zero-dollar training dataset 706, a zero-dollar probability annotation 1004 that corresponds to the zero-dollar training attribute vector 1002. In various cases, the training component 116 can electronically feed the zero-dollar training attribute vector 1002 to the zero-dollar machine learning model 702 as input. In various aspects, this can cause the zero-dollar machine learning model 702 to produce an output 1006 based on the zero-dollar training attribute vector 1002. As a non-limiting example, suppose that the zero-dollar machine learning model 702 is a deep learning model. In such case, an input layer of the zero-dollar machine learning model 702 can receive the zero-dollar training attribute vector 1002, the zero-dollar training attribute vector 1002 can complete a forward pass through one or more hidden layers of the zero-dollar machine learning model 702, an output layer of the zero-dollar machine learning model 702 can compute the output 1006, based on activations provided by the one or more hidden layers. In any case, the output 1006 can be considered as one or more scalars, one or more vectors, one or more matrices, one or more tensors, and/or one or more character strings that indicate how likely successful zero-dollar authentication of the financial payment card represented by the zero-dollar training attribute vector 1002 is believed/inferred to be by the zero-dollar machine learning model 702. In contrast, the zero-dollar probability annotation 1004 can be considered as indicating in ground-truth fashion how likely successful zero-dollar authentication of the financial payment card represented by the zero-dollar training attribute vector 1002 is known to be. Note that, if the zero-dollar machine learning model 702 has so far undergone no and/or little training, then the output 1006 can be quite inaccurate. In any case, the training component 116 can compute an error/loss (e.g., cross-entropy) between the output 1006 and the zero-dollar probability annotation 1004. In various aspects, the training component 116 can then update (e.g., via backpropagation) the internal parameters of the zero-dollar machine learning model 702, based on the computed error/loss.

In various aspects, the training component 116 can repeat the above-described training procedure for each of the zero-dollar training attribute vectors in the zero-dollar training dataset 706, with the ultimate result being that the internal parameters of the zero-dollar machine learning model 702 can become iteratively optimized for accurately inferring likelihoods of successful zero-dollar authentication based on inputted attribute vectors. Those having ordinary skill in the art will appreciate that any suitable training batch sizes, any suitable number of training epochs, any suitable error/loss functions, and/or any suitable training termination criteria can be implemented by the training component 116.

Figure 11:
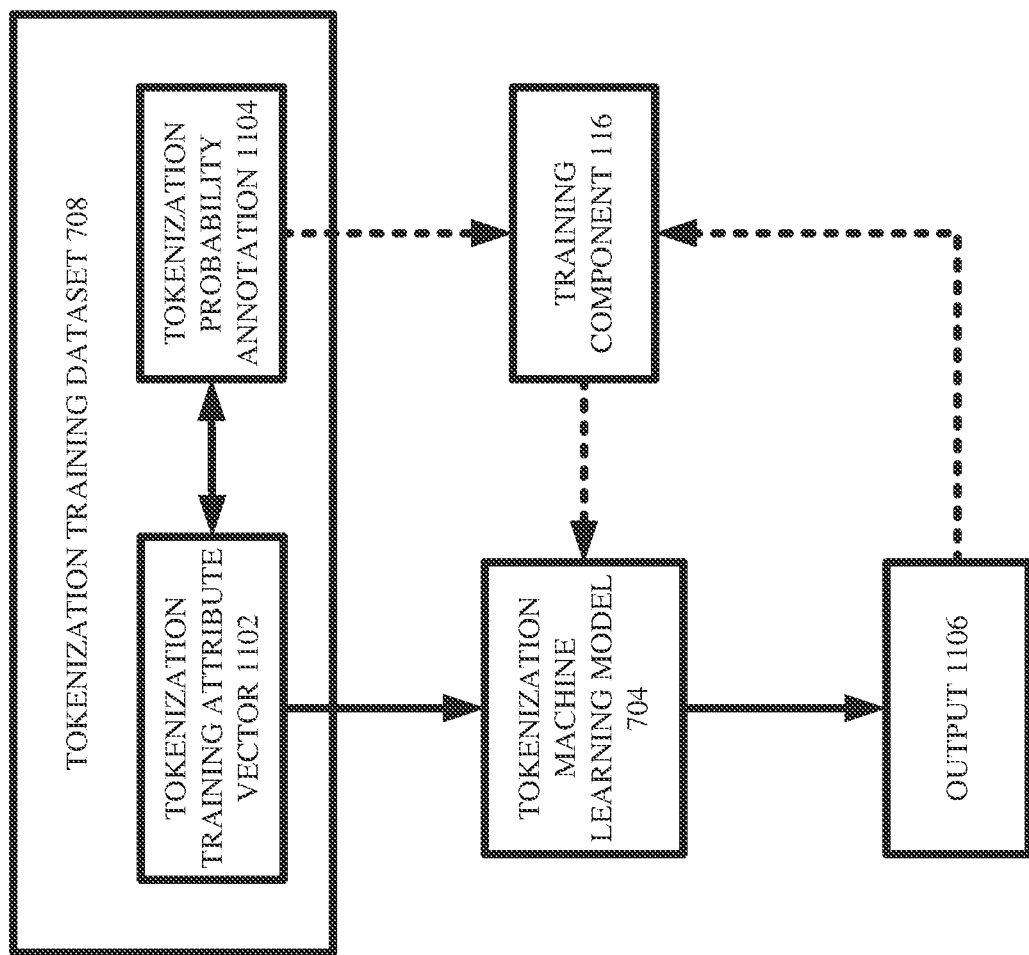

As shown in FIG. 11, the training component 116 can electronically train, in supervised fashion, the tokenization machine learning model 704 on the tokenization training dataset 708. More specifically, in various aspects, the internal parameters (e.g., weight matrices, bias values) of the tokenization machine learning model 704 can be initialized in any suitable fashion (e.g., randomly initialized). In various instances, the training component 116 can electronically select a tokenization training attribute vector 1102 from the tokenization training dataset 708. Accordingly, the training component 116 can electronically identify, in the tokenization training dataset 708, a tokenization probability annotation 1104 that corresponds to the tokenization training attribute vector 1102. In various cases, the training component 116 can electronically feed the tokenization training attribute vector 1102 to the tokenization machine learning model 704 as input. In various aspects, this can cause the tokenization machine learning model 704 to produce an output 1106 based on the tokenization training attribute vector 1102. As a non-limiting example, suppose that the tokenization machine learning model 704 is a deep learning model. In such case, an input layer of the tokenization machine learning model 704 can receive the tokenization training attribute vector 1102, the tokenization training attribute vector 1102 can complete a forward pass through one or more hidden layers of the tokenization machine learning model 704, and an output layer of the tokenization machine learning model 704 can compute the output 1106, based on activations provided by the one or more hidden layers. In any case, the output 1106 can be considered as one or more scalars, one or more vectors, one or more matrices, one or more tensors, and/or one or more character strings that indicate how likely successful tokenization authentication of the financial payment card represented by the tokenization training attribute vector 1102 is believed/inferred to be by the tokenization machine learning model 704. In contrast, the tokenization probability annotation 1104 can be considered as indicating in ground-truth fashion how likely successful tokenization authentication of the financial payment card represented by the tokenization training attribute vector 1102 is known to be. Note that, if the tokenization machine learning model 704 has so far undergone no and/or little training, then the output 1106 can be quite inaccurate. In any case, the training component 116 can compute an error/loss (e.g., cross-entropy) between the output 1106 and the tokenization probability annotation 1104. In various aspects, the training component 116 can then update (e.g., via backpropagation) the internal parameters of the tokenization machine learning model 704, based on the computed error/loss.

In various aspects, the training component 116 can repeat the above-described training procedure for each of the tokenization training attribute vectors in the tokenization training dataset 708, with the ultimate result being that the internal parameters of the tokenization machine learning model 704 can become iteratively optimized for accurately inferring likelihoods of successful tokenization authentication based on inputted attribute vectors. Those having ordinary skill in the art will appreciate that any suitable training batch sizes, any suitable number of training epochs, any suitable error/loss functions, and/or any suitable training termination criteria can be implemented by the training component 116.

Figure 12:
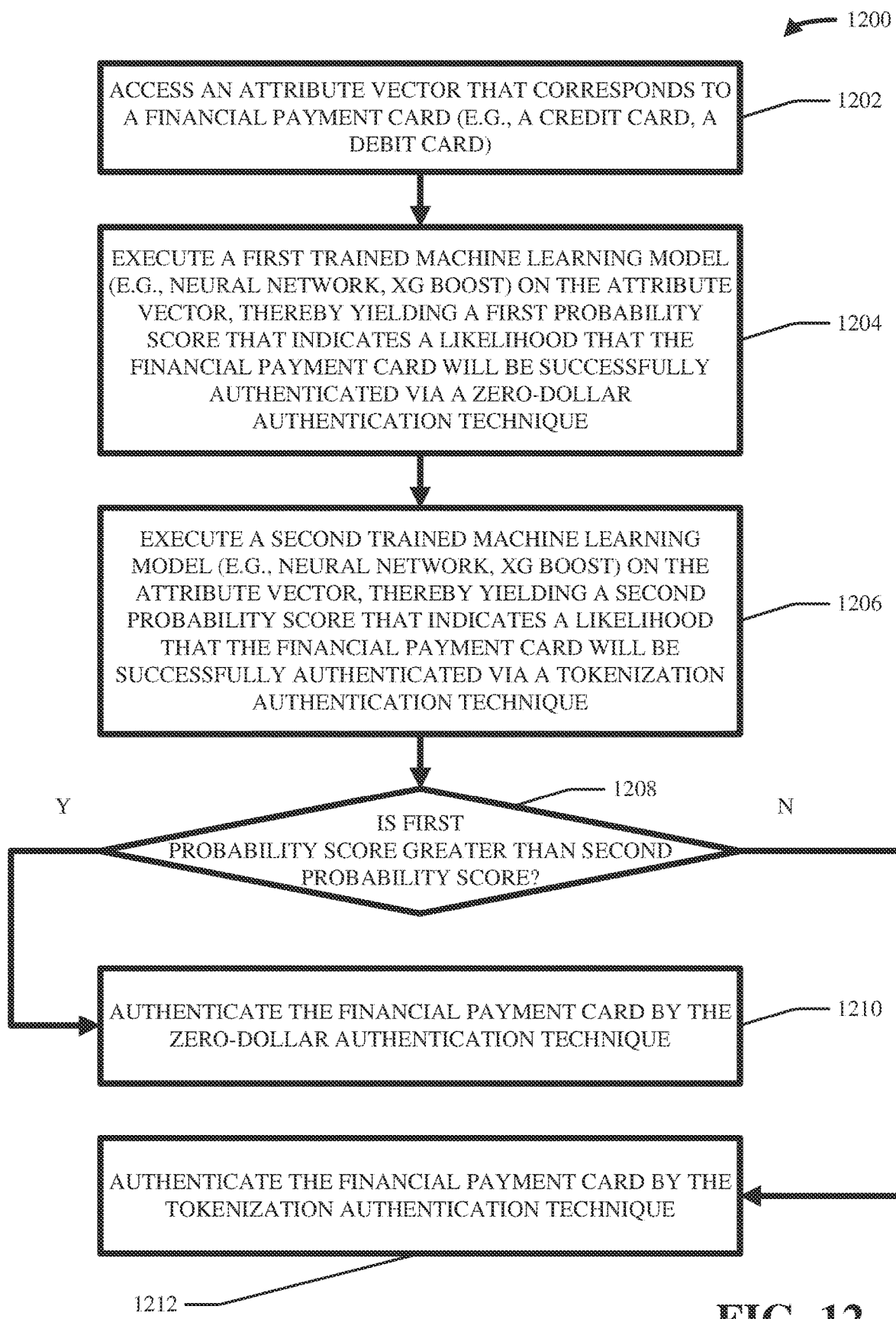
FIG. 12 illustrates a high-level flow diagram of an example, non-limiting computer-implemented method that facilitates card authentication technique selection via machine learning in accordance with one or more embodiments described herein.

FIG. 12 illustrates a high-level flow diagram of an example, non-limiting computer-implemented method 1200 that can facilitate card authentication technique selection via machine learning in accordance with one or more embodiments described herein. In various cases, the card authentication selection system 102 can facilitate the computer-implemented method 1200.

In various embodiments, act 1202 can include accessing, by a computerized system (e.g., via 110), an attribute vector (e.g., 202) that corresponds to a financial payment card (e.g., 104). In various cases, the financial payment card can be a credit card or a debit card.

In various aspects, act 1204 can include executing, by the computerized system (e.g., via 112), a first trained machine learning model (e.g., 702) on the attribute vector. This can yield a first probability score (e.g., 802) that indicates a likelihood that the financial payment card will be successfully authenticated via a zero-dollar authentication technique. In various cases, the first trained machine learning model can be a neural network or an XG Boost model.

In various instances, act 1206 can include executing, by the computerized system (e.g., via 112), a second trained machine learning model (e.g., 704) on the attribute vector. This can yield a second probability score (e.g., 804) that indicates a likelihood that the financial payment card will be successfully authenticated via a tokenization authentication technique. In various cases, the second trained machine learning model can be a neural network or an XG Boost model.

In various aspects, act 1208 can include determining, by the computerized system (e.g., via 112), whether the first probability score is greater than the second probability score. If so, the computer-implemented method 1200 can proceed to act 1210. If not, the computer-implemented method 1200 can proceed to act 1212.

In various instances, act 1210 can include authenticating, by the computerized system (e.g., via 114), the financial payment card by the zero-dollar authentication technique.

In various instances, act 1212 can include authenticating, by the computerized system (e.g., via 114), the financial payment card by the tokenization authentication technique.

Figure 13:
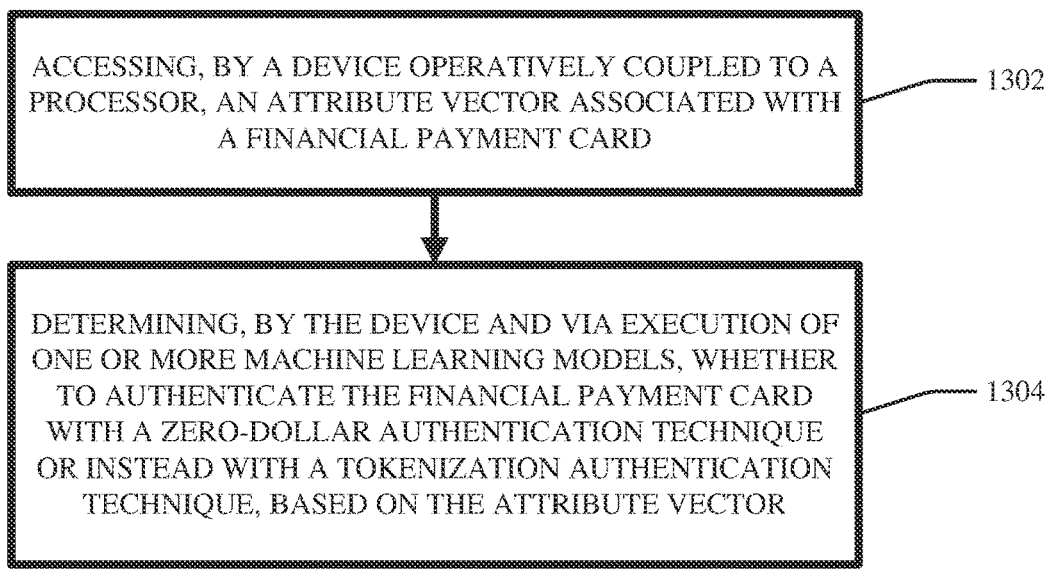
FIG. 13 illustrates a high-level flow diagram of an example, non-limiting computer-implemented method that facilitates card authentication technique selection via machine learning in accordance with one or more embodiments described herein.

FIG. 13 illustrates a high-level flow diagram of an example, non-limiting computer-implemented method 1300 that can facilitate card authentication technique selection via machine learning in accordance with one or more embodiments described herein. In various cases, the card authentication selection system 102 can facilitate the computer-implemented method 1300.

In various embodiments, act 1302 can include accessing, by a device (e.g., via 110) operatively coupled to a processor, an attribute vector (e.g., 202) associated with a financial payment card (e.g., 104).

In various aspects, act 1304 can include determining, by the device (e.g., via 112) and via execution of one or more machine learning models (e.g., 204, 702, and/or 704) whether to authenticate the financial payment card with a zero-dollar authentication technique or instead of a tokenization authentication technique, based on the attribute vector.

Although not explicitly shown in FIG. 13, the computer-implemented method 1300 can further include: executing, by the device (e.g., via 114), the zero-dollar authentication technique with respect to the financial payment card, when the device determines that the financial payment card should be authenticated with the zero-dollar authentication technique; and executing, by the device (e.g., via 114), the tokenization authentication technique with respect to the financial payment card, when the device determines that the financial payment card should be authenticated with the tokenization authentication technique.

Although not explicitly shown in FIG. 13, the determining, by the device and via execution of one or more machine learning models, whether to authenticate the financial payment card with the zero-dollar authentication technique or instead with the tokenization authentication technique, based on the attribute vector, can include: inputting, by the device (e.g., via 112), the attribute vector associated with the financial payment card to a machine learning model (e.g., 204), wherein the machine learning model produces as output a binary classification label that indicates either that the financial payment card should be authenticated with the zero-dollar authentication technique or instead that the financial payment card should be authenticated with the tokenization authentication technique.

Although not explicitly shown in FIG. 13, the computer-implemented method 1300 can further comprise: accessing, by the device (e.g., via 110), a training dataset (e.g., 208), wherein the training dataset includes a set of training attribute vectors (e.g., 402) and a set of authentication technique annotations (e.g., 404) that respectively correspond to the set of training attribute vectors; and training, by the device (e.g., via 116), the machine learning model on the training dataset.

Although not explicitly shown in FIG. 13, the determining, by the device and via execution of the one or more machine learning models, whether to authenticate the financial payment card with the zero-dollar authentication technique or instead with the tokenization authentication technique, based on the attribute vector, can include: inputting, by the device (e.g., via 112), the attribute vector associated with the financial payment card to a first machine learning model (e.g., 702), wherein the first machine learning model produces as output a first probability (e.g., 802) representing a likelihood that the financial payment card will be successfully authenticated by the zero-dollar authentication technique; and inputting, by the device (e.g., via 112), the attribute vector associated with the financial payment card to a second machine learning model (e.g., 704), wherein the second machine learning model produces as output a second probability (e.g., 804) representing a likelihood that the financial payment card will be successfully authenticated by the tokenization authentication technique. In various cases, the device can determine that the financial payment card should be authenticated with the zero-dollar authentication technique when the first probability is greater than the second probability. In other cases, the device can determine that the financial payment card should be authenticated with the tokenization authentication technique when the first probability is lesser than the second probability.

Although not explicitly shown in FIG. 13, the computer-implemented method 1300 can further include: accessing, by the device (e.g., via 110), a first training dataset (e.g., 706), wherein the first training dataset includes a first set of training attribute vectors (e.g., 902) and a set of zero-dollar probability annotations (e.g., 904) that respectively correspond to the first set of training attribute vectors; and training, by the device (e.g., via 116), the first machine learning model on the first training dataset.

Although not explicitly shown in FIG. 13, the computer-implemented method 1300 can further include: accessing, by the device (e.g., via 110), a second training dataset (e.g., 708), wherein the second training dataset includes a second set of training attribute vectors (e.g., 906) and a set of tokenization probability annotations (e.g., 908) that respectively correspond to the second set of training attribute vectors; and training, by the device (e.g., via 116), the second machine learning model on the second training dataset.

Accordingly, various embodiments described herein can include a computerized tool that can identify, via execution of one or more machine learning models, which of zero-dollar authentication or tokenization authentication should be applied to a given financial payment card.

Although the herein disclosure mainly describes embodiments in which a binary selection is made between zero-dollar authentication and tokenization authentication, this is a mere non-limiting example. Those having ordinary skill in the at will appreciate that the herein-described teachings can be applied so as to select from among any suitable number of distinct card authentication techniques that technique which has the highest likelihood of success and/or the lowest likelihood of failure (e.g., not limited to choosing only between zero-dollar authentication and tokenization authentication). In such cases, non-binary machine learning classifiers can be implemented (e.g., classifiers that select one classification for a given input from among more than two possible classifications).

Although the herein disclosure mainly describes embodiments in which one or more machine learning models are executed on the attribute vector 202, this is a mere non-limiting example. Those having ordinary skill in the art will appreciate that, in various embodiments, the one or more machine learning models described herein can be configured to receive any other suitable input in addition to the attribute vector 202 (e.g., can be configured to receive as input authorization histories of a financial payment card, transaction histories of a financial payment card, processing errors associated with a financial payment card).

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 14:
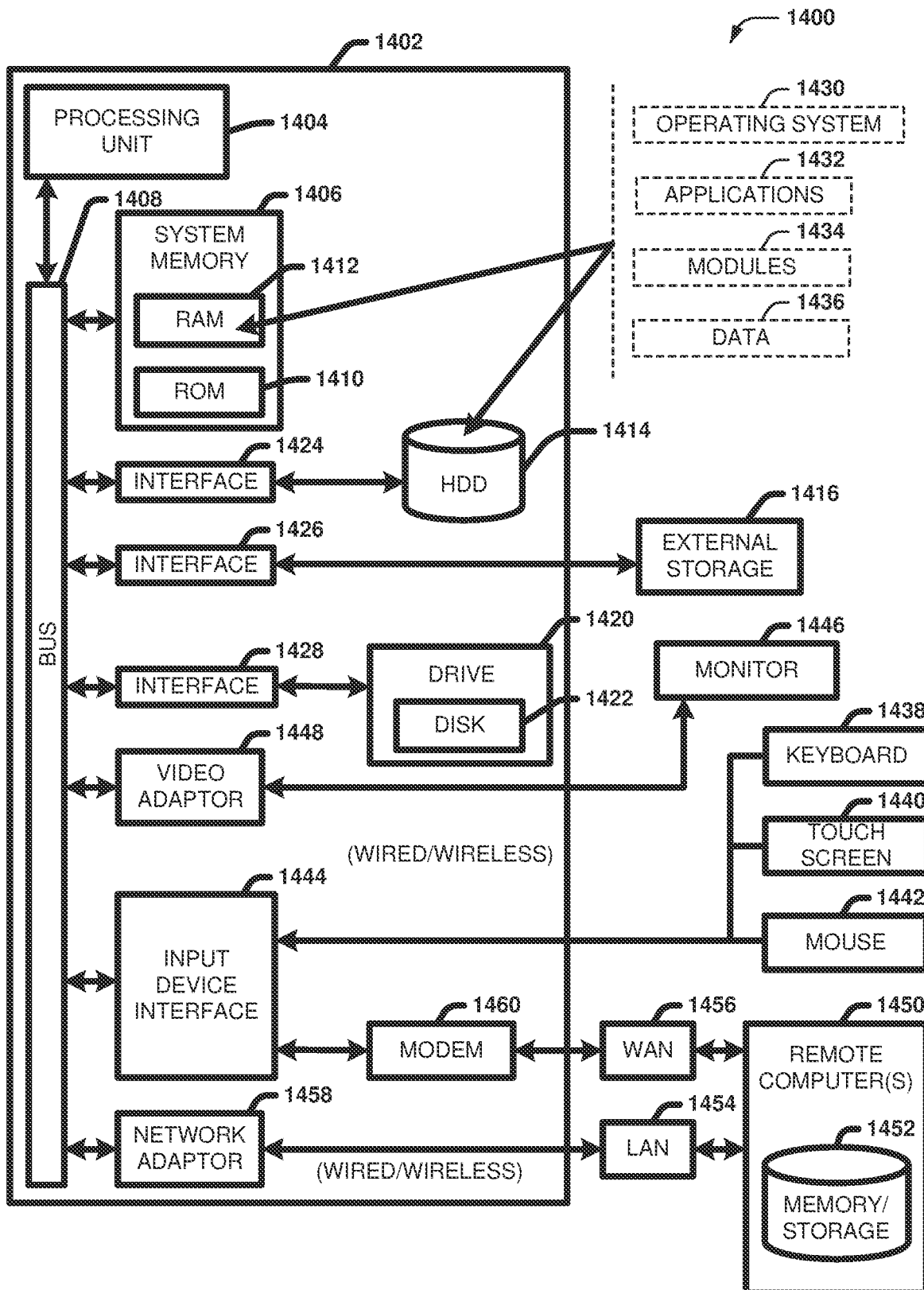
FIG. 14 illustrates a block diagram of an example, non-limiting operating environment in which one or more embodiments described herein can be facilitated.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and a drive 1420, e.g., such as a solid state drive, an optical disk drive, which can read or write from a disk 1422, such as a CD-ROM disc, a DVD, a BD, etc. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
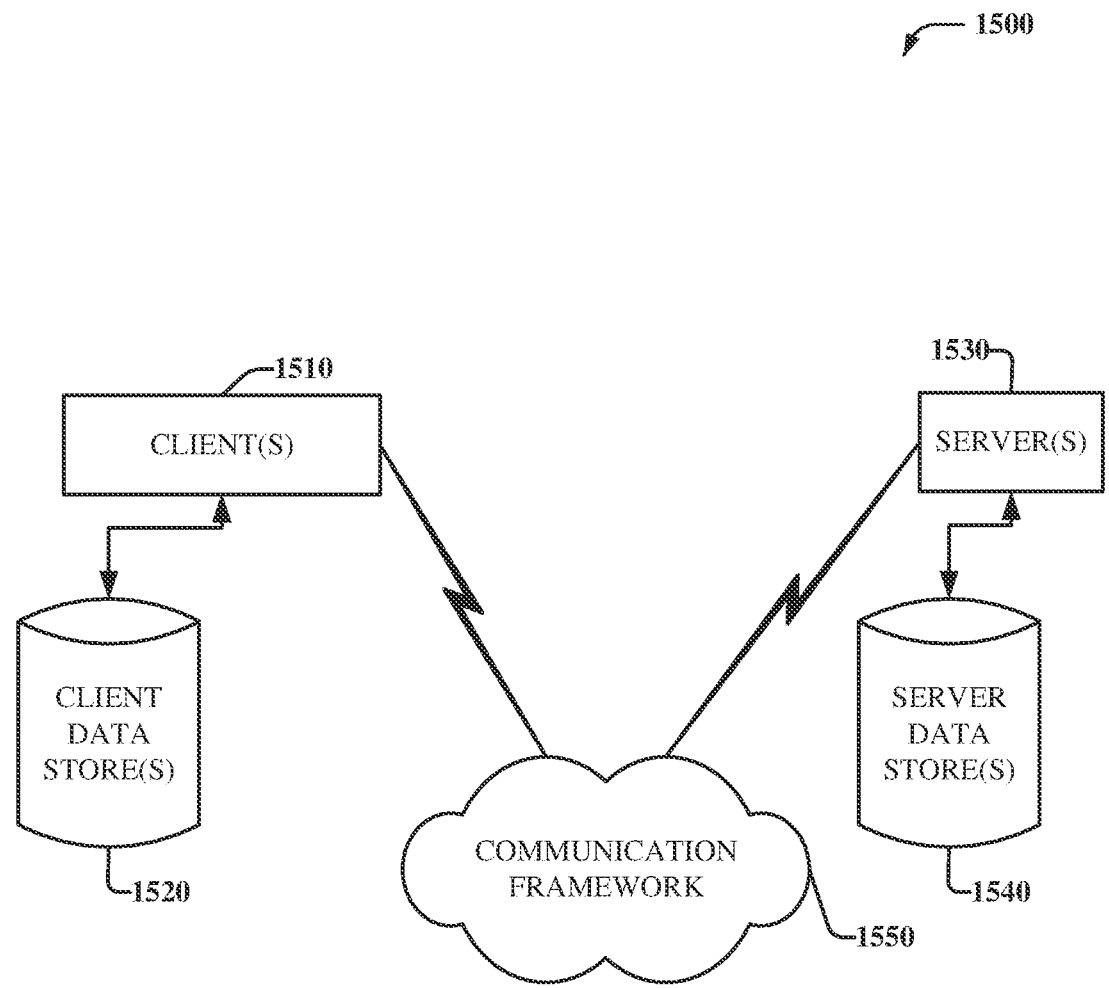
FIG. 15 illustrates an example networking environment operable to execute various implementations described herein.

FIG. 15 is a schematic block diagram of a sample computing environment 1500 with which the disclosed subject matter can interact. The sample computing environment 1500 includes one or more client(s) 1510. The client(s) 1510 can be hardware and/or software (e.g., threads, processes, computing devices). The sample computing environment 1500 also includes one or more server(s) 1530. The server(s) 1530 can also be hardware and/or software (e.g., threads, processes, computing devices). The servers 1530 can house threads to perform transformations by employing one or more embodiments as described herein, for example. One possible communication between a client 1510 and a server 1530 can be in the form of a data packet adapted to be transmitted between two or more computer processes. The sample computing environment 1500 includes a communication framework 1550 that can be employed to facilitate communications between the client(s) 1510 and the server(s) 1530. The client(s) 1510 are operably connected to one or more client data store(s) 1520 that can be employed to store information local to the client(s) 1510. Similarly, the server(s) 1530 are operably connected to one or more server data store(s) 1540 that can be employed to store information local to the servers 1530.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to various embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
a processor that executes computer-executable instructions stored in a computer-readable memory, which causes the processor to perform operations comprising:
receiving, by a processor, a training dataset, wherein the training dataset includes a set of training attribute vectors and a set of authentication technique annotations that respectively correspond to the set of training attribute vectors;
training, by the processor, a machine learning model to initialize a set of internal parameters, identify the training dataset, and feed the training dataset to the machine learning model to determine which type of authentication technique to apply to a financial payment card based on the set of training attribute vectors and the respectively corresponding set of authentication technique annotations;
producing a training output based on the set of internal parameters;
applying, by the processor, the set of internal parameters to the machine learning model;
accessing electronically, by the processor, an attribute vector associated with the financial payment card from a data structure;
determining, by the processor and via execution of the machine learning model, an output indicative of a probability of successfully authenticating the financial payment card based on the attribute vector and the training dataset;
determining, by the processor and the machine learning model, whether to authenticate the financial payment card with a zero-dollar authentication technique or a tokenization authentication technique, based on the attribute vector and the output;
executing, by the processor, the zero-dollar authentication technique with respect to the financial payment card, when the processor determines that the financial payment card should be authenticated with the zero-dollar authentication technique; and
executing, by the processor, the tokenization authentication technique with respect to the financial payment card, when the processor determines that the financial payment card should be authenticated with the tokenization authentication technique.

2. The system of claim 1, wherein the processor determines, based on the attribute vector and via execution of the machine learning model, whether to authenticate the financial payment card with the zero-dollar authentication technique or the tokenization authentication technique by:
inputting, by the processor, the attribute vector associated with the financial payment card to a first machine learning model,
generating, by the first machine learning model, a first successful probability output,
inputting, by the processor, the attribute vector associated with the financial payment card to a second machine learning model,
generating by the second machine learning model, a second successful probability output,
identifying, by the processor, whether to authenticate the financial payment card based on the first successful probability output and the second successful probability output, and
wherein the output further includes a binary classification label that indicates the financial payment card should be authenticated with the zero-dollar authentication technique or the tokenization authentication technique.

3. The system of claim 1,
wherein the set of authentication technique annotations represent a ground-truth authentication technique that corresponds to the respective training attribute vector.

4. The system of claim 1, wherein training the machine learning model further comprises:
initializing, by the processor, a set of internal parameters of the machine learning model at random,
identifying, by the processor, a respective training attribute vector and a respectively corresponding authentication technique annotation in the training dataset,
feeding, by the processor, the respective training attribute vector to the machine learning model,
producing a training output based on the respective training attribute vector,
computing, by the processor, a cross-entropy between the training output and the respective authentication technique annotation, and
applying, by the processor, the set of internal parameters to the machine learning model based on the cross-entropy via backpropagation,
wherein the training output is based on the respective training attribute vector; and
wherein the set of internal parameters applied to the machine learning model is based on the cross-entropy via backpropagation.

5. The system of claim 1, wherein the attribute vector includes at least one of a type of the financial payment card, an issuing institution of the financial payment card, an issuing network of the financial payment card, an address associated with the financial payment card, an expiration date of the financial payment card, an activation date of the financial payment card, an account number of the financial payment card, or a transaction history of the financial payment card.

6. The system of claim 4, wherein the machine learning model trained for each training attribute vector in the training dataset; and
wherein the set of internal parameters of the machine learning model become iteratively optimized for accurately inferring authentication techniques based on attribute vectors.

7. The system of claim 1, wherein the machine learning model is a tree-based model.

8. The system of claim 7, wherein the machine learning model is an XG Boost model or a random forest model.

9. A computer-implemented method, comprising:
receiving, by a device operatively coupled to a processor, a training dataset, wherein the training dataset includes a set of training attribute vectors and a set of authentication technique annotations that respectively correspond to the set of training attribute vectors;
initializing, by the processor, a set of internal parameters,
identifying, by the processor, a respective training attribute vector and a respectively corresponding authentication technique annotation in the training dataset, and
feeding, by the processor, the respective training attribute vector to one or more machine learning model models to determine which type of authentication technique to apply to a financial payment card based on the set of training attribute vectors and the respectively corresponding set of authentication technique annotations;
producing a training output based on the respective training attribute vector;
applying, by the processor, the set of internal parameters to the one or more machine learning models;
accessing electronically, by the device, an attribute vector associated with the financial payment card;
determining, by the device and via execution of one or more machine learning models, an output indicative of a probability of successfully authenticating the financial payment card based on the attribute vector and the training dataset;
determining, by the device and via execution of the one or more machine learning models, whether to authenticate the financial payment card with a zero-dollar authentication technique or a tokenization authentication technique, based on the attribute vector and the output;
executing, by the device, the zero-dollar authentication technique with respect to the financial payment card, when the device determines that the financial payment card should be authenticated with the zero-dollar authentication technique; and executing, by the device, the tokenization authentication technique with respect to the financial payment card, when the device determines that the financial payment card should be authenticated with the tokenization authentication technique.

10. The computer-implemented method of claim 9, wherein the determining, by the device and via execution of the one or more machine learning models, whether to authenticate the financial payment card with the zero-dollar authentication technique or the tokenization authentication technique, based on the attribute vector, includes:

inputting, by the device, the attribute vector associated with the financial payment card to a first machine learning model, wherein the first machine learning model produces as output a first probability representing a likelihood that the financial payment card will be successfully authenticated by the zero-dollar authentication technique.

11. The computer-implemented method of claim 10, wherein the determining, by the device and via execution of the one or more machine learning models, whether to authenticate the financial payment card with the zero-dollar authentication technique or instead with the tokenization authentication technique, based on the attribute vector, further includes:

inputting, by the device, the attribute vector associated with the financial payment card to a second machine learning model, wherein the second machine learning model produces as output a second probability representing a likelihood that the financial payment card will be successfully authenticated by the tokenization authentication technique.

12. The computer-implemented method of claim 11, wherein the device determines that the financial payment card should be authenticated with the zero-dollar authentication technique when the first probability is greater than the second probability.

13. The computer-implemented method of claim 11, wherein the device determines that the financial payment card should be authenticated with the tokenization authentication technique when the first probability is lesser than the second probability.

14. The computer-implemented method of claim 11, wherein receiving the training dataset further comprises:

receiving, by the device, a first training dataset, wherein the first training dataset includes a first set of training attribute vectors and a set of zero-dollar probability annotations that respectively correspond to the first set of training attribute vectors; and training, by the device, the first machine learning model on the first training dataset.

15. The computer-implemented method of claim 14, wherein receiving the training dataset further comprises:

receiving, by the device, a second training dataset, wherein the second training dataset includes a second set of training attribute vectors and a set of tokenization probability annotations that respectively correspond to the second set of training attribute vectors; and training, by the device, the second machine learning model on the second training dataset.

16. A computer program product for facilitating card authentication technique selection via machine learning, the computer program product comprising a computer-readable medium having program instructions embodied therewith, the program instructions executable by a processor to cause the processor to perform operations comprising:

training, by the processor, a machine learning model on a training dataset, wherein the training dataset includes a set of training attribute vectors and a set of authentication technique annotations that respectively correspond to the set of training attribute vectors, wherein training the machine learning model further comprises:

identifying, by the processor, a respective training attribute vector and a respectively corresponding authentication technique annotation in the training dataset, feeding, by the processor, the respective training attribute vector to the machine learning model, producing a training output based on the respective training attribute vector, and applying the training output to the machine learning model;

accessing, by the processor, an attribute vector associated with a financial payment card;

executing, by the processor, the machine learning model on the attribute vector, wherein the machine learning model produces as output a binary classification label indicative of a probability of successfully authenticating the financial payment card based on the attribute vector and the training dataset and whether the financial payment card should be authenticated with a zero-dollar authentication technique or a tokenization authentication technique; and executing, by the processor and with respect to the financial payment card, a card authentication technique that is consistent with the binary classification label.

17. The computer program product of claim 16, wherein the operations further comprise:

wherein the set of authentication technique annotations represent a ground-truth authentication technique that corresponds to the respective training attribute vector.

18. The computer program product of claim 16, wherein the attribute vector includes a type of the financial payment card, an issuing institution of the financial payment card, an expiration date of the financial payment card, and an account number of the financial payment card.

19. The computer program product of claim 16, wherein the machine learning model is a tree-based classifier.

20. The computer program product of claim 16, wherein the machine learning model is a deep learning classifier.

* * * * *